United States Patent [19]

O'Neill et al.

[11] Patent Number: 4,744,083
[45] Date of Patent: May 10, 1988

[54] SATELLITE-BASED POSITION DETERMINING AND MESSAGE TRANSFER SYSTEM WITH MONITORING OF LINK QUALITY

[75] Inventors: Gerard K. O'Neill, Princeton; Leslie O. Snively, Rocky Hill, both of N.J.

[73] Assignee: Geostar Corporation, Washington, D.C.

[21] Appl. No.: 650,493

[22] Filed: Sep. 14, 1984

[51] Int. Cl.⁴ .............................................. G06F 11/10
[52] U.S. Cl. ........................................ 371/22; 371/43; 371/37
[58] Field of Search .................... 371/5, 30, 31, 32, 33, 371/34, 43, 44, 45; 370/104, 84, 92; 375/10, 100

[56] References Cited

U.S. PATENT DOCUMENTS

| | | |
|---|---|---|
| 3,668,403 | 6/1972 | Meilander . |
| 3,714,650 | 1/1973 | Fuller et al. . |
| 3,742,498 | 6/1973 | Dunn . |
| 3,755,811 | 8/1973 | Breckman . |
| 3,824,547 | 7/1974 | Green ..................................... 371/32 |
| 4,015,259 | 3/1977 | Siverhus et al. . |
| 4,114,155 | 9/1978 | Raab . |
| 4,128,835 | 12/1978 | Russell . |
| 4,278,977 | 7/1981 | Nossen . |
| 4,291,403 | 9/1981 | Weddill ................................... 371/5 |
| 4,309,764 | 1/1982 | Acampora ............................. 371/5 |
| 4,322,848 | 3/1982 | Snyder ................................... 371/43 |
| 4,359,733 | 11/1982 | O'Neill . |
| 4,363,123 | 12/1982 | Grover .................................. 371/5 |
| 4,422,171 | 12/1983 | Wortley ................................ 371/32 |
| 4,519,080 | 5/1985 | Snyder ................................... 371/43 |
| 4,549,297 | 10/1985 | Nishimoto ............................ 371/33 |
| 4,653,053 | 3/1987 | Pelchat ................................... 371/43 |

FOREIGN PATENT DOCUMENTS

0050478 1/1986 European Pat. Off. .
58-35414 8/1983 Japan .

OTHER PUBLICATIONS

G. K. O'Neill, "Geostar", *AOPA Pilot*, vol. 26, No. 9, pp. 53-57, (Sep. 1983).
G. K. O'Neill, "Satellites Instead", *AOPA Pilot*, vol. 25, No. 1, pp. 51-54 and 59-63, (Jul. 1982).
G. K. O'Neill, "Satellite Air Traffic Control", *Astronautics & Aeronautics*, vol. 19, No. 3, pp. 27-31, (Mar. 1981).
V. A. Ilyin, "Telecontrol and Telemetering", *M. Energoizdat*, pp. 248-253, FIG. 8.1, (1982).
V. I. Potegov, "The TDRSS Tracking and Data Relay Satellite System", *Foreign Radio Electronics*, Nos. 5 and 6, (1984).

*Primary Examiner*—Michael R. Fleming
*Attorney, Agent, or Firm*—Robbins & Laramie

[57] ABSTRACT

A radio position determination and message transfer system is implemented using a number of satellites in geostationary orbit for relaying interrogation and reply signals between a ground station and a user-carried transceiver. Message information can be exchanged between a given user transceiver and the ground station, as well as between different user transceivers. The user transceiver is provided with means for monitoring the quality of the radio communication link between the transceiver and one or more of the satelites, based on errors detected in the received interrogation signals. The transmission of a reply signal by the transceiver is enabled only when the link quality is found to be acceptable. The reply signal may contain message information or may constitute a request for a position fix. In the latter case, the transceiver may be configured to await favorable link quality to more than one satellite before the reply signal is transmitted.

30 Claims, 12 Drawing Sheets

SATELLITE-BASED POSITION DETERMINING AND MESSAGE TRANSFER SYSTEM WITH MONITORING OF LINK QUALITY

BACKGROUND OF THE INVENTION

1. Field of the Invention

The present invention relates generally to radio positioning and communication systems, and is particularly concerned with a radio position determination and message transfer system in which one or more artificial satellites are employed as relay stations for the ranging and message signals.

2. Description of the Prior Art

The present invention constitutes an improvement or modification of the satellite-based position determining system described in U.S. Pat. No. 4,359,733, issued to G. K. O'Neill on Nov. 16, 1982. In that system, the user vehicles are equipped with transponders for transmitting a uniquely coded beacon or reply signal in response to a received general interrogation signal. Three repeater-carrying satellites are provided at spaced orbital locations above the earth for receiving and retransmitting the reply signals produced by the vehicle transponders. A ground station periodically transmits the general interrogation signal, and also receives and processes the reply signals retransmitted by the three satellites in order to determine the instantaneous positions of the user vehicles.

In order to avoid signal overlap and equipment saturation at the ground station, each vehicle transponder in U.S. Pat. No. 4,359,733 includes means responsive to the general interrogation signal for inhibiting the response of the transponders to subsequent general interrogation signals for a predetermined time interval following the response of the transponder to a first general interrogation signal. This avoids the need for discrete addressing of individual transponders, time-slotted polling, multiple frequencies, and the various other complex techniques which have previously been considered necessary to reduce signal overlap at the receiving station. In addition, the possibility of varying the inhibit interval allows the effective response rate to be modified for different classes of users, or for the same user during different periods of need, without changing the actual interrogation rate at the ground station.

The system described in U.S. Pat. No. 4,359,733 is effective not only to receive ranging signals from the user vehicles for position computation purposes, but also to relay messages between the ground station and the user vehicles. These messages may consist, for example, of emergency alerts sent from the user vehicles to the ground station, or of computed position or navigational information sent from the ground station to the user vehicles. In the case of inbound messages sent from the user vehicles to the ground station, the message data is keyed into the user's equipment and sent out as part of the user's response to the next interrogation signal. In the case of outbound messages sent from the ground station to the user, the message data includes a destination address specifying the particular user for which the message is intended.

For certain classes of users, such as aircraft, there is not usually a problem with regard to the need for line-of-sight communication with the satellites. For other classes of users, however, the quality of the communication link to the satellites may not be assured at all times. Particularly in the case of land vehicles in motion, there is a basic problem in that the vehicle may be passing through or near obstructions, such as buildings, dense foliage, tunnels, and so on, where the communication link quality becomes too poor for transmission. If the user attempts to transmit a message under these conditions, or if the ground station attempts to send a message to the user, the message will not get through and must be repeated. At the user level, the message retry consumes additional power and is therefore disadvantageous in the case of battery-operated user equipment. A message retry by the ground station is also disadvantageous since it wastes power in the satellite and increases the total signal traffic.

SUMMARY OF THE INVENTION

In accordance with the present invention, the foregoing disadvantages and limitations are largely avoided by providing the user equipment with the ability to monitor the quality of the radio communication link between the user and one or more of the satellites. The user equipment does not respond to interrogations from the ground station until the link quality is found to be acceptable, thereby avoiding excessive errors in the message transmissions and reducing the likelihood that transmitter power will be wasted on a message transmission that will not reach its intended destination.

In one aspect, the present invention is directed to a radio communication system comprising a central station for transmitting interrogation signals over a radio communication link, and a remote transceiver for receiving the interrogation signals from the central station over the radio communication link. The remote transceiver responds to the interrogation signals by transmitting reply signals to the central station. The remote transceiver is provided with control means for measuring the quality of the radio communication link between the central station and the remote transceiver, and for allowing the transmission of a reply signal by the transceiver only when the communication link has a predetermined minimum quality. Preferably, the control means is effective to detect errors in the received interrogation signals, and to derive from the absence or presence of such errors a measurement of the quality of the communication link. In a particularly preferred embodiment, the control means maintains a running count of erros detected in a number of recently received interrogation signals, and compares this count with a predetermined threshold value in order to determine whether the communication link has the predetermined minimum quality required for the transmission of a reply signal by the transceiver.

In another aspect, the present invention is directed to a radio communication system for sending messages to a ground station from a remote transceiver by means of a satellite. The communication system includes a remote transceiver for receiving interrogation signals containing error detection codes and for transmitting reply signals carrying message information in response to the interrogation signals. A ground station is provided for transmitting the interrogation signals, including the error detection codes, and for receiving reply signals from the remote transceiver. The system also includes at least one relay satellite for relaying the interrogation signals from the ground station to the remote transceiver, and for relaying reply signals from the remote transceiver to the ground station. The remote transceiver is provided with control means for utilizing the error detection codes in the received interrogation signals to provide an indication of the quality of the radio communication link to the remote transceiver. The control means operates to suppress the transmission of a reply signal by the remote transceiver until a predetermined minimum quality of the communication link is indicated. Preferably, the remote transceiver further includes display means connected to the control means for displaying an indication of the measured quality of the communication link to a user.

Further aspects of the invention will become apparent in the following detailed description and in the appended claims.

BRIEF DESCRIPTION OF THE DRAWINGS

The various objects, advantages and novel features of the present invention will be more readily apprehended from the following detailed description in connection with the appended drawings, in which.

Throughout the drawings, like reference numerals are used to identify like parts.

DETAILED DESCRIPTION OF THE PREFERRED EMBODIMENT

General Description

In the aforementioned U.S. Pat. No. 4,359,733, a system is described in which the positions of multiple user vehicles are determined by means of ranging signals relayed through a number of satellites. In addition, certain types of messages are relayed between the ground station and the user vehicles. In the case of the inbound link from the user vehicles to the ground station, these messages may consist of emergency alerts and the like. In the case of the outbound link from the ground station to the user vehicles, the messages may consist of computed position or navigational information. As an extension of this capability, messages may be exchanged between different users through the intermediary of the satellites and ground station. When a particular user desires to send a message to a different user, or to the ground station, the message may be keyed into the sending user's equipment and sent out as part of the user's reply to the next interrogation signal. The message will include an address specifying the destination user, or, in the case of messages intended for the ground station, a reserved address specifying the ground station.

Figure 1:
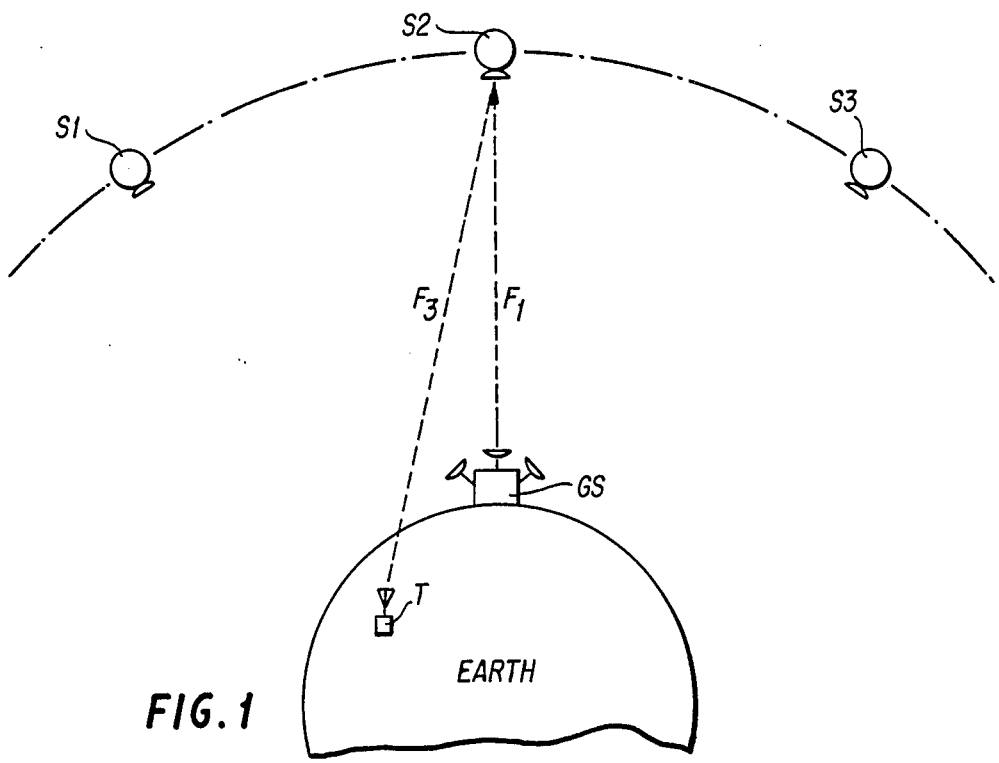
FIG. 1 depicts a preferred arrangement of satellites in accordance with the present invention, and further illustrates the manner in which an outbound interrogation signal from the ground station is relayed to a user by one of the satellites.

In accordance with a preferred embodiment of the present invention, three repeater carrying satellites are placed in geostationary equatorial orbit around the earth, each satellite being located in a different longitudinal position in this orbit. Such an arrangement is illustrated in FIG. 1, where the three satellites are indicated at S1, S2 and S3. It is to be understood that the present invention does not require that the satellites S1, S2 and S3 be in geostationary orbit; these satellites may instead have near-synchronous, non-synchronous, elliptical, inclined or any other type of orbit in which their positions are readily ascertainable at any given time. In order to simplify analysis and to describe the operation of the invention in terms of a fixed ground station, however, the satellites S1, S2 and S3 will hereinafter be assumed to be in geostationary orbit around the earth in the general arrangement illustrated in FIG. 1.

With further reference to FIG. 1, the ground station GS continuously transmits a digitally modulated signal, referred to as the outbound signal. The outbound signal consists of a sequence of interrogation signal frames, each of which contains a specific pattern of bits, serving as an interrogation pulse, and message bits. The rate at which the frames are transmitted in the preferred embodiment of the invention is of the order of 95 frames per second. The outbound signal is transmitted at frequency F1 to satellite S2, which translates the frequency to F3 and broadcasts the outbound signal to the entire area serviced by the system. The outbound signal is received by a plurality of user transceivers such as the transceiver T shown in FIG. 1. The users may include surface vehicles, non-surface vehicles such as aircraft, and pedestrians. Fixed-site users desiring message exchanges with other fixed or mobile users can also be served by the system. Assuming user T wishes to have current position information, or desires to send a message, the transceiver responds to the next received interrogation by transmitting a reply signal in the form of a pulse group, referred to as the inbound or reply signal. The inbound signal contains a ranging code, the user identification, and, possibly, a message, and is transmitted in synchronism with the reception of the interrogation signal.

Figure 2:
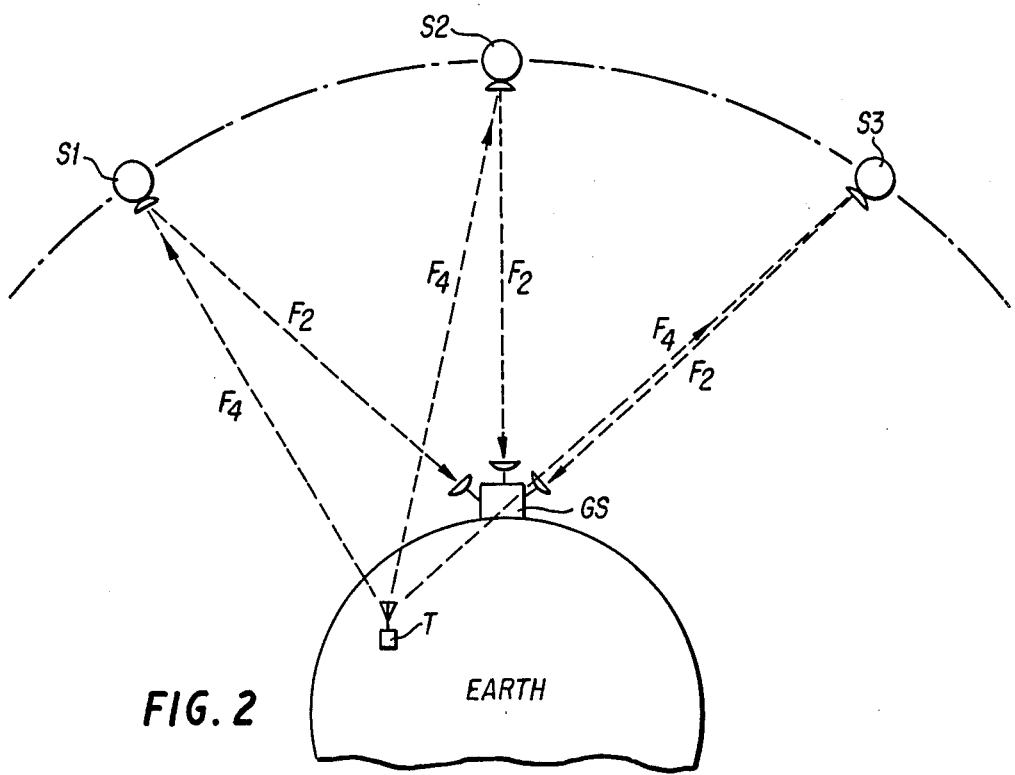
FIG. 2 illustrates the manner in which a reply signal from the user transceiver is received by each of the three satellites and retransmitted to the ground station.
Figure 4:
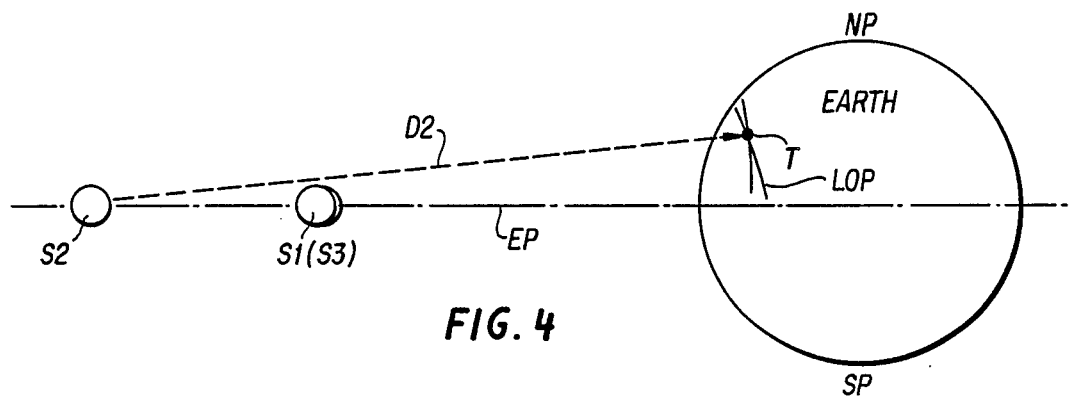
FIGS. 3 and 4 depict the geometrical basis for the calculation of user position based on the arrival times of the three retransmitted signals at the ground station.
Figure 3:
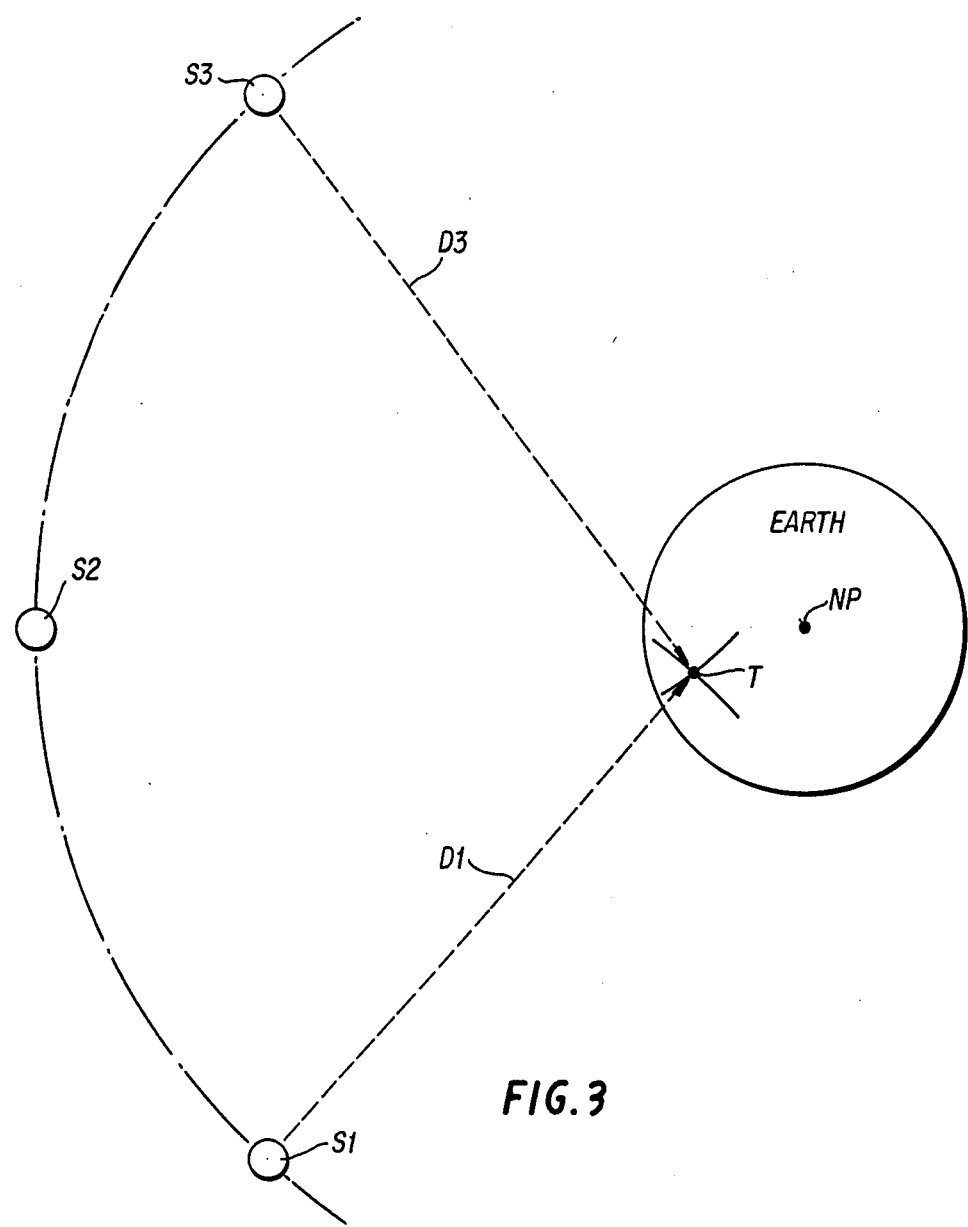

With reference to FIG. 2, the inbound signal is transmitted at frequency F4 to satellites S1, S2 and S3. Each satellite transponds the inbound signal at frequency F2 to the ground station GS. Based on the known positions of the three satellites, the time of transmission of the interrogation signal from the ground station, and the times of reception at the ground station of the transponded reply signals, the ground station can calculate the separation distance between satellite S1 and the user, the separation distance between satellite S2 and the user, and the separation distance between satellite S3 and the user. Based on this information, the user is known to lie on a sphere of radius D1 centered on satellite S1 and simultaneously on a sphere of radius D3 centered on satellite S3, as illustrated in FIG. 3. The intersection of the two spheres is a circle, known as the line of position (LOP), which passes through the user's position. Since the user also lies on a sphere of radius D2 centered on satellite S2, the intersection of this sphere with the LOP determines the user position, as depicted in FIG. 4. There will always be two intersections of the sphere centered on satellite S2 with the LOP. However, these intersections are symmetrically located in the northern and southern hemispheres and the resulting ambiguity can be resolved by approximate knowledge of the user's position.

The exact user's position is encoded into a binary message, addressed to the specific user, and included in one of the next outbound signal frames to be transmitted. The outbound signal is transponded by satellite S2 and the position message is received and decoded by the user. The response time of the system, that is, the time delay between a user request for position and the receipt of the position message by the user, is normally in the range of 0.6 second.

It should be noted that a message transmission, unlike a position request, requires only one inbound satellite link for the reply signal. Therefore, a user wishing to send or receive a message, but not wishing to receive position information, requires a clear line of sight to only one of the available satellites.

The possibility exists that user reply signals from two different users could arrive at one or more satellites at approximately the same time and therefore overlap. This possibility is accommodated in the invention by a combination of code division multiple access (CDMA) and random access time division multiple access (TDMA). Each user is assigned a pseudo-noise (PN) code with which the user transceiver modulates its carrier. Prior to the modulation process, the data bits, i.e., the user identification and the message bits, are added to the code symbols which are referred to as chips. In the preferred embodiment of the invention, the data rate is much less than the code symbol rate resulting in a ratio of 625 chips per bit. As a result of the ground station processing, which removes the PN codes from the received signals, several signals may be received simultaneously with acceptably low levels of mutual interference. In the preferred embodiment of the invention, 32 different PN codes will be available for assignment to the users and 32 different signals may be received simultaneously by the ground station.

If the inbound signals from two users employing the same PN code overlap, then one or both signals will fail to be correctly received by the ground station. If a user transceiver fails to receive an acknowledgement or position fix from the ground station within a delay of 0.7 seconds after transmitting a request, the transceiver assumes an overlap has occurred and retransmits the request. To prevent repeated overlaps, each user transceiver waits a random time delay before retransmitting the request.

Figure 5:
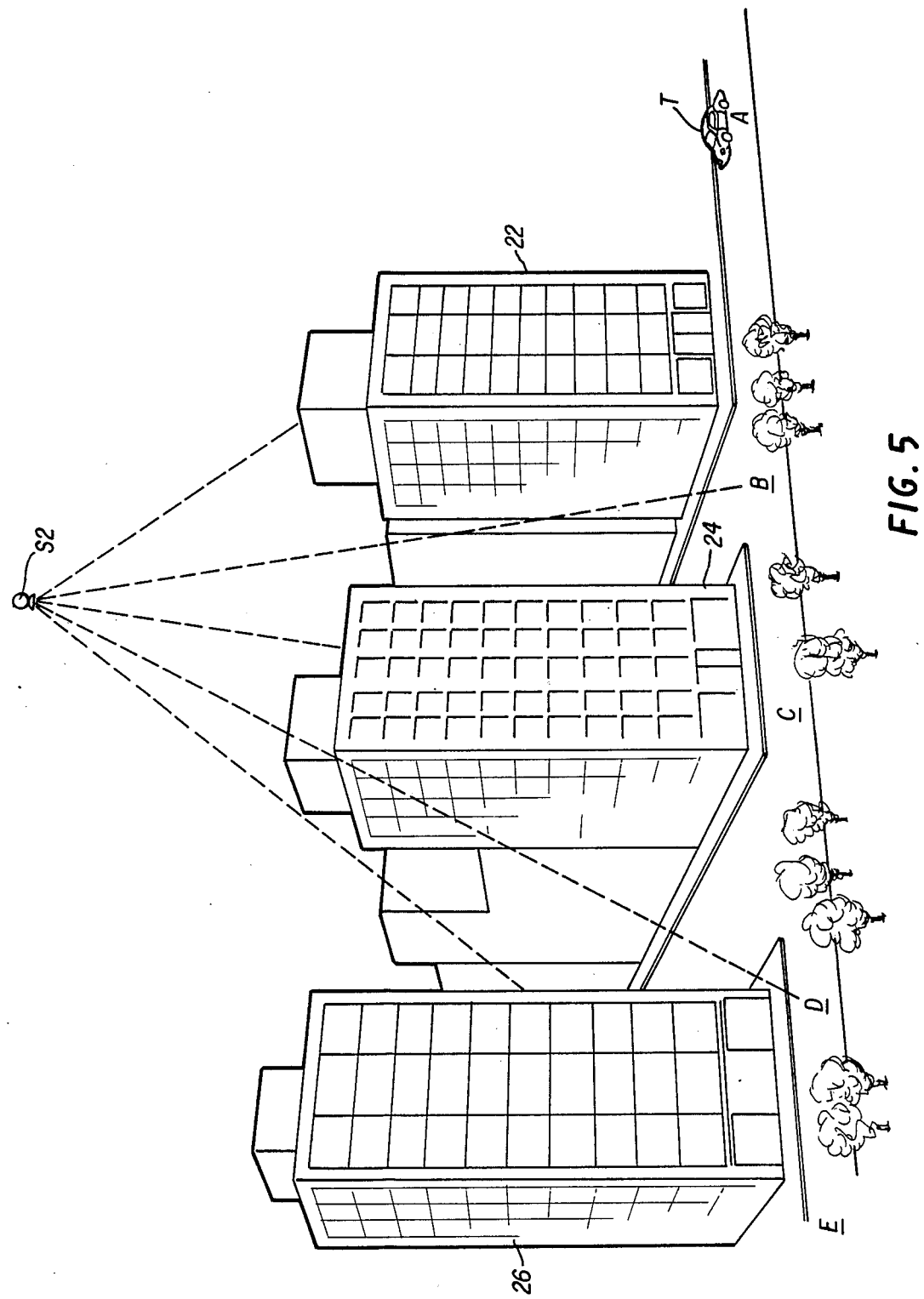
FIG. 5 illustrates the manner in which the signal path between a particular satellite and a user in an urban environment may be blocked or clear depending on the relative positions of the user, satellite, and nearby buildings.

In order to accommodate the mobile user who is operating in urban or mountainous environments, the invention provides for transmission control based on measured link quality. The situation for a mobile urban user is illustrated in FIG. 5. In this example, the user T has clear access to satellite S2 at positions B and D. However, the user-to-satellite paths incur significant losses for user positions A, C and E due to the intervening buildings 22, 24 and 26, respectively. In the preferred embodiment of the invention, the user transceiver is arranged to automatically and continuously monitor the link quaility and to transmit only when link quality is acceptable. Each frame of the outbound signal from the ground station to the user incorporates an error detecting code in the form of parity check bits appended to the data bits. By decoding this code, the user transceiver can detect the occurrence of bit errors within the frame. Thus, the transceiver makes one link quality check for each frame or about 95 checks per second. In the preferred embodiment of the invention, the user transceiver averages the link quality over a period of time. Specifically, the transceiver maintains a running count of the number of erroneous frames which have occurred during the most recently received 7 frames. Even with time averaging of link quality there is sufficient time for the transceiver to transmit a message when the user passes between buildings or other obstructions. (For example, at 60 mph, 7 frames correspond to about 2.0 meters of motion). Additionally, the link quality information is continuously conveyed to the user via the transceiver display panel.

Transmissions on the outbound links are controlled in a similar manner. Prior to transmitting a long message, the ground station will send a link availability probe (LAP), a short inquiry addressed to the user for whom the message is destined. If the link quality is acceptable, the user responds to the LAP affirmatively and the ground station transmits the message. This insures that the long message will be sent only when it is assured of reaching the intended user, thereby utilizing the signal traffic capacity of the system in the most efficient manner possible.

Another feature of the invention is the exchange of multiple acknowledgements. When a message from a user is correctly received by the ground station, an acknowledgement, designated ACK-1, is transmitted back to the originating user and the message is forwarded to the destination user. When the message is correctly received by the destination user transceiver, a second acknowledgement, designated ACK-2, is sent back to the originating user via the ground station. When the message is read by the destination user, a third acknowledgement, designated ACK-3, is sent back to the originating user. Thus the originating user has a complete record of the progress of his message through the system.

Additional aspects of the present invention, to be discussed in more detail below, include multiple simultaneous outbound signals, PN code alternation on the outbound link, control of the outbound chip-per-bit ratio based on measured link quality, random beam searching at the user level, and coding of user replies by coarse and fine time slots.

Position Computation

Referring to FIGS. 1-4, a method will be described for calculating the position coordinates of the user T based on the measured arrival times T1, T2 and T3 of the return signals produced in response to an interrogation signal generated by the ground station at time T0. For convenience, the calculation is carried out in terms of spherical coordinates of the usual form (r, $\theta$, $\phi$), wherein r is measured from the earth's center, $\theta$ represents 90° minus latitude, and $\phi$ represents longitude from the Greenwich Prime Meridian. Therefore, the respective coordinates of the ground station GS, satellites S1, S2 and S3, and user T may be expressed as follows:

Ground station: $(r_{GS}, \theta_{GS}, \phi_{GS})$
Satellite S1: $(r_{S1}, \theta_{S1}, \phi_{S1})$
Satellite S2: $(r_{S2}, \theta_{S2}, \phi_{S2})$
Satellite S3: $(r_{S3}, \theta_{S3}, \phi_{S3})$
User: $(r_T, \theta_T, \phi_T)$ All sets of coordinates other than those for the user T are known. Other necessary quantities which are known or measurable are the interrogation signal transmission time T0, the response delay $T_D$ of the user transceiver, and the response delay $T_S$ of the satellite repeaters, which is assumed to be the same for all satellites. It is further assumed that all signals travel uniformly at the speed of light (c). To the extent that either of these assumptions is inaccurate in a particular case, it is a routine matter to make the appropriate corrections in the equations that follow.

In general, the straight-line distance between two points $(r_0, \theta_0, \phi_0)$ and $(r_i, \theta_i, \phi_i)$ is expressed as follows:

$$d = [(r_i \sin\theta_i \cos\phi_i - r_0 \sin\theta_0 \cos\phi_0)^2 + (r_i \sin\theta_i \sin\phi_i - r_0 \sin\theta_0 \sin\phi_0)^2 + (r_i \cos\theta_i - r_0 \cos\theta_0)^2]^{\frac{1}{2}} \quad (1)$$

Therefore the transit time $\Delta T$ of a signal traversing this distance at the speed of light (c) would be expressed as:

$$\Delta T = (1/c) [(r_i \sin\theta_i \cos\phi_i - r_0 \sin\theta_0 \cos\phi_0)^2 + (r_i \sin\theta_i \sin\phi_i - r_0 \sin\theta_0 \sin\phi_0)^2 + (r_i \cos\theta_i - r_0 \cos\theta_0)^2]^{\frac{1}{2}} \quad (2)$$

As a convenience, the right side of equation (2) may be expressed in functional notation as follows:

$$\Delta T = f[(r_0, \theta_0, \phi_0), (r_i, \theta_i, \phi_i)] \quad (3)$$

This notation will be employed consistently hereinafter, keeping in mind that the function f is merely a shorthand for the complete, albeit much longer, expression on the right side of equation (2).

It should be readily apparent that the distance measurement, and hence transit time, will be the same if the coordinates of the two points $(r_0, \theta_0, \phi_0)$ and $(r_i, \theta_i, \phi_i)$ are interchanged in equations (1) and (2). In terms of the shorthand functional notation defined above, this means that:

$$f[(r_0, \theta_0, \phi_0), (r_i, \theta_i, \phi_i)] = f[(r_i, \theta_i, \phi_i), (r_0, \theta_0, \phi_0)] \quad (4)$$

With reference to FIGS. 1 and 2, it will be seen that the difference between the transmission time T0 of the interrogation signal from the ground station and the time of arrival T2 at the ground station of the return signal associated with the satellite S2 will be:

$$T2 - T0 = f[(r_{S2}, \theta_{S2}, \phi_{S2}), (r_{GS}, \theta_{GS}, \phi_{GS})] + T_S + \quad (5)$$
$$f[(r_T, \theta_T, \phi_T), (r_{S2}, \theta_{S2}, \phi_{S2})] + T_D +$$
$$f[(r_{S2}, \theta_{S2}, \phi_{S2}), (r_T, \theta_T, \phi_T)] + T_S +$$

-continued
$$f[(r_{GS}, \theta_{GS}, \phi_{GS}), (r_{S2}, \theta_{S2}, \phi_{S2})]$$

Applying equation (4) and combining terms yields:

$$T2 - T0 = 2f[(r_{S2}, \theta_{S2}, \phi_{S2}), (r_{GS}, \theta_{GS}, \phi_{GS})] + 2T_S + \quad (6)$$
$$T_D + 2f[(r_{S2}, \theta_{S2}, \phi_{S2}), (r_T, \theta_T, \phi_T)]$$

The equations for the return signals from satellites S1 and S3 are longer since two satellites are involved in each path. For the signal returned through satellite S1:

$$T1 - T0 = f[(r_{S2}, \theta_{S2}, \phi_{S2}), (r_{GS}, \theta_{GS}, \phi_{GS})] + T_S + \quad (7)$$
$$f[(r_T, \theta_T, \phi_T), (r_{S2}, \theta_{S2}, \phi_{S2})] + T_D +$$
$$f[(r_{S1}, \theta_{S1}, \phi_{S1}), (r_T, \theta_T, \phi_T)] + T_S +$$
$$f[(r_{GS}, \theta_{GS}, \phi_{GS}), (r_{S1}, \theta_{S1}, \phi_{S1})]$$

Applying a similar procedure for the signal returned through satellite S3:

$$T3 - T0 = f[(r_{S2}, \theta_{S2}, \phi_{S2}), (r_{GS}, \theta_{GS}, \phi_{GS})] + T_S + \quad (8)$$
$$f[(r_T, \theta_T, \phi_T), (r_{S2}, \theta_{S2}, \phi_{S2})] + T_D +$$
$$f[(r_{S3}, \theta_{S3}, \phi_{S3}), (r_T, \theta_T, \phi_T)] + T_S +$$
$$f[(r_{GS}, \theta_{GS}, \phi_{GS}), (r_{S3}, \theta_{S3}, \phi_{S3})]$$

Equations (6), (7) and (8) form a set of three equations in which the user coordinates $(r_T, \theta_T, \phi_T)$ are the only unknowns, the remaining quantities being known or directly measurable. These equations may be solved for the coordinates $(r_T, \theta_T, \phi_T)$ using standard matrix methods. See, for example, Korn and Korn, *Mathematical Handbook for Scientists and Engineers* (McGraw-Hill, New York, 1961), chapter 13. When the solution is completed, the coordinate $r_T$ is converted to the user's altitude above mean sea level (MSL) by subtracting the radius of the earth $r_E$, and the coordinate $\theta_T$ is converted to the user's latitude by forming the difference $(90° - \theta_T)$. The coordinate $\phi_T$ is equal to the user's longitude directly.

With further reference to equations (6), (7) and (8), it may be observed that, from the standpoint of the ground station computer, the coordinates $(r_{S1}, \theta_{S1}, \phi_{S1})$, $(r_{S2}, \theta_{S2}, \phi_{S2})$ and $(r_{S3}, \theta_{S3}, \phi_{S3})$ may be treated as fixed constants since they are associated with geostationary satellites. While this is approximately true, minor perturbations will normally occur in the orbital position of a geostationary satellite due to the gravitational influences of the sun and moon. For this reason, the satellite coordinates are preferably left as variables in equations (6), (7) and (8), and inserted by the ground station computer during the course of each user position calculation. The coordinates thus inserted may then be continually updated based upon known satellite position schedules stored in the ground station computer memory, or upon periodic direct measurements of the satellite positions.

If the satellites S1, S2 and S3 are non-stationary, rather than stationary as has been assumed thus far, continual updating of their coordinates as described above is necessary, rather than optional. Similarly, if the ground station is movable rather than fixed (as, for example, if it is carried aboard a seagoing vessel), the ground station coordinates ($r_{GS}$, $\theta_{GS}$, $\phi_{GS}$) must be left as variables in the equations (6), (7) and (8) and updated and inserted prior to each user position calculation.

Geographically, the solution of equations (6), (7) and (8) will actually give rise to two possible mirror-image positions for the user T, one in the Northern Hemisphere and one in the Southern Hemisphere. This ambiguity follows intuitively from the fact that the earth's equatorial plane includes all three satellites S1, S2 and S3, and thus defines a plane of symmetry for the system. This may be visualized by noting that an interrogation signal produced by an equatorial ground station GS at a time T0 would give rise to the same set of return signal arrival times T1, T2 and T3 for a user located at a given latitude, longitude and altitude north of the equator and for a user located at an equal latitude, longitude and altitude south of the equator. In reality, however, this ambiguity causes little problem and can easily be resolved in the system software by approximate knowledge of the user's position.

The frequency of interrogation signals, 95 per second in the preferred embodiment, results in a special form of position ambiguity. The user reply signal which arrives at the ground station at time T1 could have been transmitted in response to any of several interrogation signals, resulting in a multiplicity of possible user positions. However, the minimum separation between possible locations is equal to the quantity (0.0105 sec/2) multiplied by the speed of light, or 1575 km. This ambiguity can be resolved most simply by approximate knowledge of the user position, obtained by using the message capability of the system to interrogate the user on a one-time or occasional basis to determine the user's general vicinity, e.g., the particular state of the United States in which the user is located.

Although a system of three satellites is illustrated in the drawings, it is to be understood that additional satellites may be added for redundancy (e.g., to serve as on-orbit spares) or to extend the geographic area covered by the system. It should also be noted that, in the case of surface-based users such as automobiles, ships and pedestrians, the minimum number of satellites may be reduced from three to two, with the ground station GS deriving height coordinates for the users from a stored terrain height map. A two-satellite system employing a stored terrain map is disclosed in the copending U.S. patent application of G. K. O'Neill filed on Aug. 16, 1984, under Ser. No. 641,385, which application is incorporated herein by reference.

Signal Formats

Exemplary formats for the signals which are exchanged between the ground station GS and the user T are shown in FIGS. 6, 7, 9 and 10. An overview of the outbound signal, transmitted by the ground station, is provided in FIG. 6. The format illustrates a continuous outbound data stream embedded in a pseudorandom noise (PN) code sequence. In the preferred embodiment, the sequence length is 131,071 chips, the chip duration is 80 nanoseconds and the frame length $T_F$ is 10.5 milliseconds.

Figure 6:
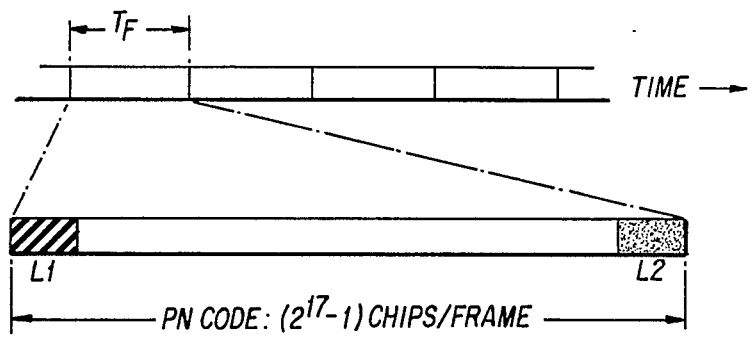
FIGS. 6 and 7 illustrate the format of the outbound interrogation signals generated by the ground station.

The basic system operational timing reference is provided by the cycling of the framing code through the all-ones state, designated by L1 in FIG. 6. The occurrence of the all-ones state is interpreted by the user transceiver as the interrogation pulse, that is, the timing mark from which it initiates a response. As will be described in a subsequent section, the transceiver uses the last few chips of the PN sequence, designated by L2 in FIG. 6, to facilitate initial acquisition of the framing mark. In the preferred embodiment, 127 chips are used for this purpose.

Figure 7:
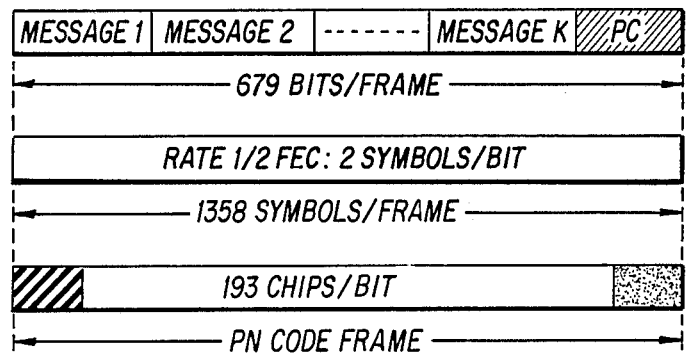
Figure 8:
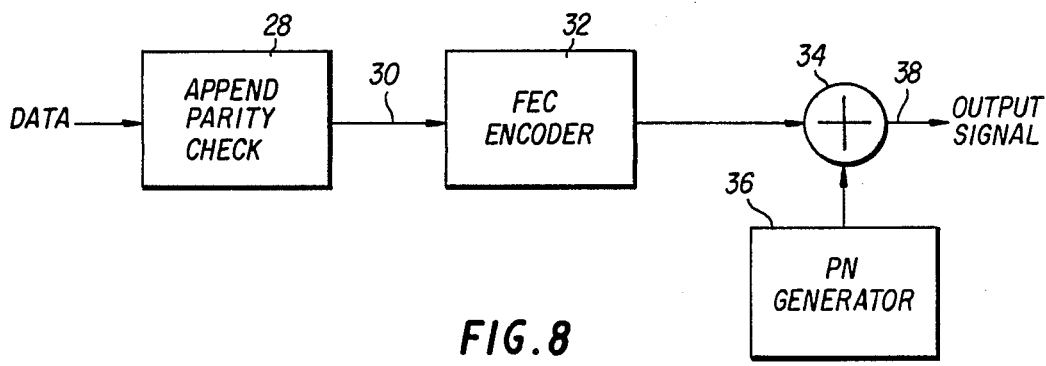
FIG. 8 illustrates the ground station hardware used to generate the interrogation signals.

FIG. 7 provides a more detailed view of the outbound composite signaling format. FIG. 8 provides an example of how the composite format can be produced. Messages destined for the various users are assembled by the ground station into a data frame consisting of those messages and an appended data frame parity check bit sequence PC, as shown in FIG. 7. In the preferred embodiment, the data frame length is 679 bits. The framed data including the appended parity check bits provided by unit 28 are present on line 30 of FIG. 8. In order to improve the error rate performance on the outbound link to the users, forward error correction (FEC) is utilized as shown by unit 32 in FIG. 8. Although the FEC encoding shown assumes two code symbols per data bit, any suitable code expansion may be selected depending on the particular noise characteristics of the outbound link. In the current example, the rate ½ encoding may be implemented via well known and conventional technology with a convolutional encoder. The FEC encoder output symbols are presented to a modulo-2 summing device 34 along with the output of the PN code generator 36 to result in the composite output signal on line 38 which is used to modulate the RF carrier of the ground station. The PN generator 36 is implemented via conventional shift register technology.

Figure 9:
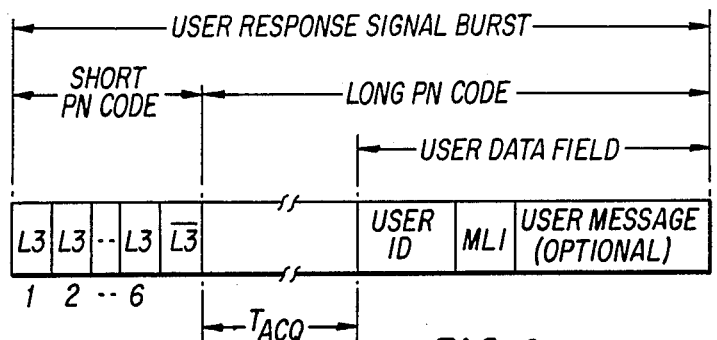
FIGS. 9 and 10 illustrate the format of the inbound reply signals from the user transceivers.

FIG. 9 provides a detailed exemplary view of the inbound signal which is transmitted by a user transceiver in response to the outbound timing reference previously described. In contrast to the continuous outbound signal, the inbound signal from any particular user is a burst signal. The user response employs two pseudorandom noise (PN) code sequences. As shown in FIG. 9, the exemplary format contains several distinct fields. The leading fields of the format, designated SHORT PN CODE, provide a preamble to aid in the acquisition of the response signal by the ground station. The acquisition aid is provided by the transmission of six repetitions of a 1023 chip PN sequence, designated L3 in FIG. 9, followed by the same sequence inverted, designated by $\overline{L3}$. This sequence is detected at the ground station by a matched filter and differential demodulator, to provide an initialization pulse to the ranging receiver. The LONG PN CODE shown in FIG. 9 is required to provide the high values of code expansion ratio required on the inbound link and is detected at the ground station using a delay locked loop. Based on current technology, the dual PN sequence approach is the preferred embodiment since a correlation matched filter using surface acoustic wave (SAW) devices for the long code is not practical.

The actual code for the delay locked loop consists of a sequence of length 131,071 chips which provides the spectrum spreading for the transmission of data. This LONG PN CODE differs from the specific PN code used on the outbound link. Furthermore, the position determining system described herein provides for segmenting users into categories such that each category has a specific assigned SHORT PN CODE and LONG PN CODE. By selecting the assigned codes from orthogonal sets of such codes, user responses can be automatically separated in the ground station and system throughput performance is increased.

Figure 10:
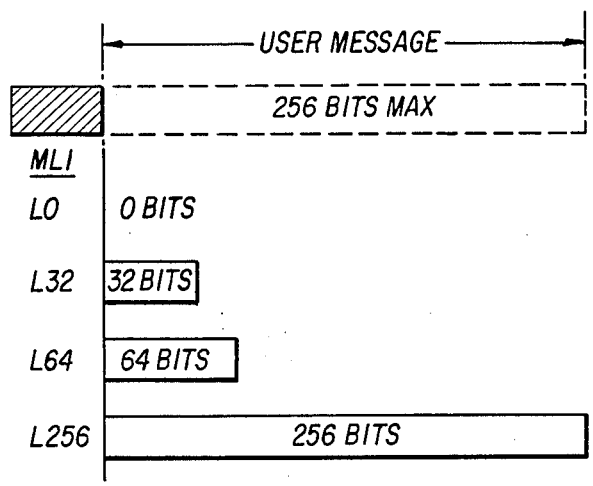

After the 1023-chip initialization sequences, a period of LONG PN CODE without user data is sent to permit the ground station delay locked loop to settle to steady state. This period is designated in FIG. 9 by $T_{ACQ}$ and, in the preferred embodiment, is 5 milliseconds long. The period is followed by the transmission of the user data starting with the specific assigned USER ID and a field MLI (message length indicator) which indicates the length of any optional user message which follows. FIG. 10 illustrates a possible relationship between MLI and the subsequent user message. Normally, a user position determinaton request would consist of the transmission of only th USER ID and an MLI value indicating "no message". In the preferred embodiment, the USER ID is nominally a 28-bit word while the MLI is nominally a 2-bit word.

As will be described in a subsequent section, the user data field is carried at a rate of 10 kbps and encoded by a rate ½ FEC encoder. This will result in a code expansion ratio of 625 PN chips per FEC symbol.

User Transceiver Equipment

Figure 11:
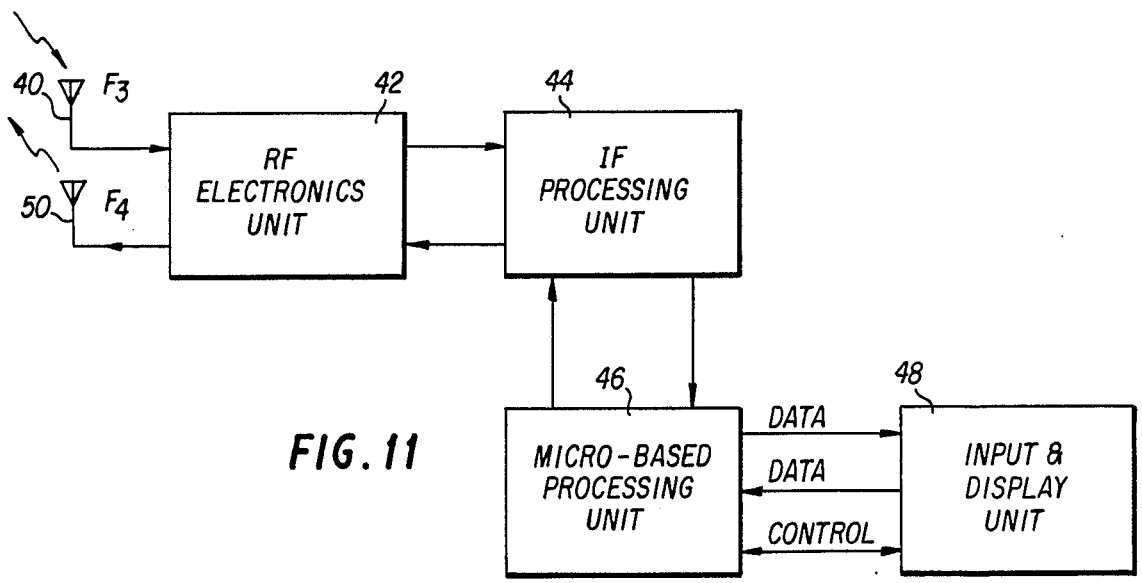
FIGS. 11-13 illustrate the hardware implementation of the user transceiver.
Figure 12:
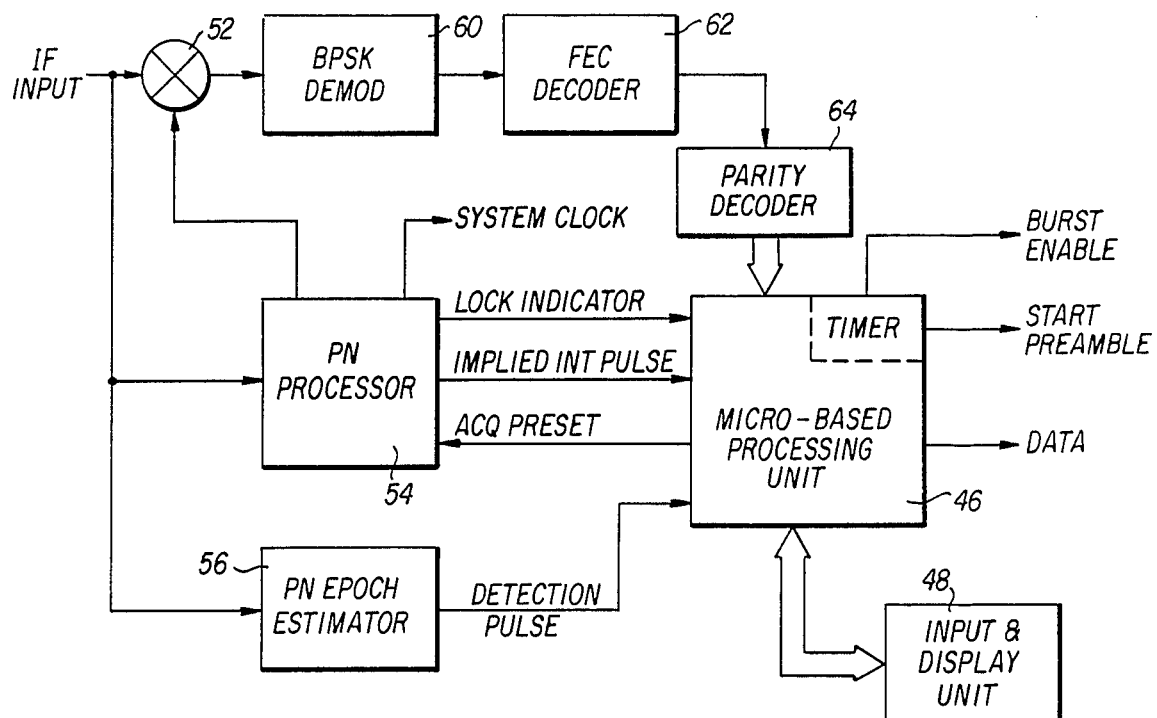
Figure 13:
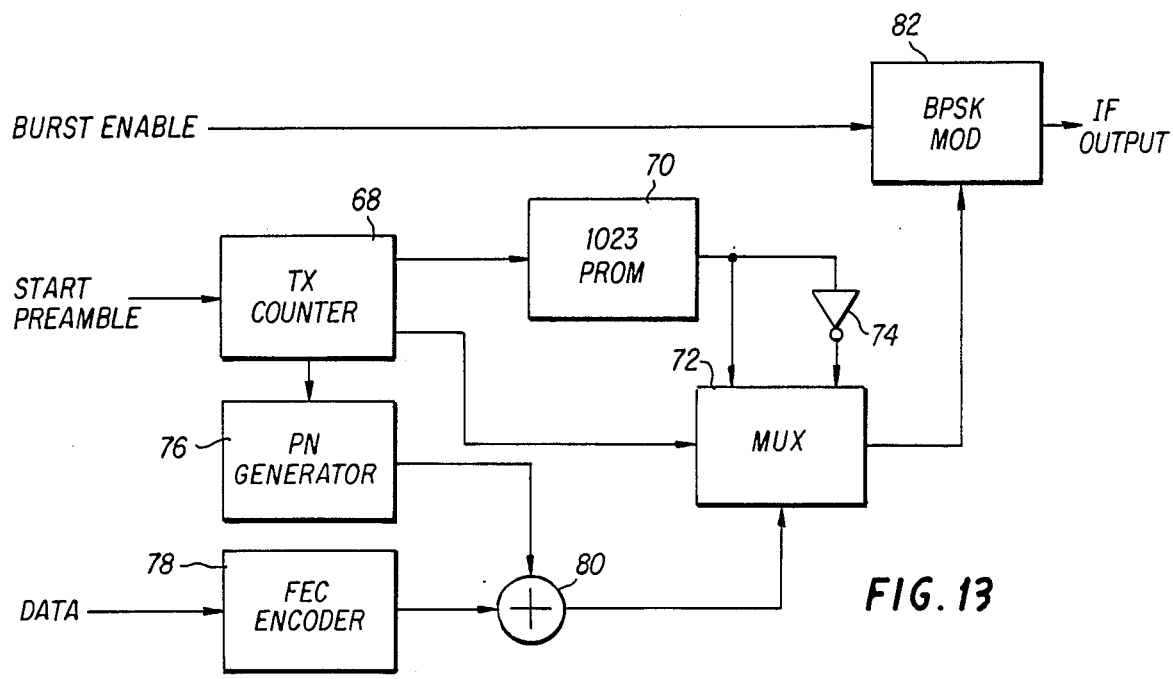

Block diagrams of the transceiver equipment which is capable of generating the signals shown in FIGS. 9 and 10 are illustrated in FIGS. 11, 12 and 13. It is to be understood that, although the block diagrams of FIGS. 11, 12 and 13 represent a preferred circuit arrangement, other circuits having equivalent input/output signal relationships may be used.

FIG. 11 depicts the general arrangement of subsystems in the transceiver. The outbound signal from the ground station is relayed to the user by satellite S2 at frequency F3, as illustrated in FIG. 1, and is captured by the receive antenna 40. The receive antenna may be implemented as a simple half-wave dipole. The captured signal is applied to the RF electronics unit 42 which provides the necessary low-noise amplification and down conversion to an intermediate frequency suitable for operation of the subsequent IF processing unit 44. Within the IF processing unit 44, the PN code is removed, the signal is demodulated, and error correction and detection is performed. The resulting data and error control information is presented to the micro-based processing unit 46. The processing unit 46 is responsible for monitoring and timing overall transceiver operation, monitoring link quality, routing incoming and outgoing messages, and formulating acknowledgements. The data and control interface between the processing unit and the user is provided by the input and display unit 48. Outgoing messages are presented to the IF processing unit 44 by the micro-based processing unit 46 for encoding and modulation. The fully formatted and modulated outgoing signal is presented at the intermediate frequency by the IF processing unit 44 to the RF electronics unit 42 and is transmitted via the transmit antenna 50 at frequency F4 to all three satellites S1, S2 and S3, as illustrated in FIG. 2. The transmit antenna 50 and receive antenna 40 may be implemented as a single antenna, preferably of the broad-beam or omnidirectional type, with appropriate diplexer circuitry.

A more detailed view of the receive functions of the user transceiver is provided in FIG. 12. The received signal, at IF INPUT, is presented in parallel to a mixer 52, a PN processor 54, and a PN epoch estimator 56. The function of the PN epoch estimator is to sense the presence of the last 127 chips in the $(2^{17}-1)$ chip PN code used in the outbound signal by means of a matched filter. A matched filter of this type may be implemented as a surface acoustic wave (SAW) device. When the last 127 chips of the PN code are sensed, a pulse labeled DETECTION PULSE is generated by the PN epoch estimator and presented to the micro-based processing unit 46. The receiver is normally in the PN tracking mode and the detection pulse is not used. When the receiver is in the acquisition mode, the detection pulse is used by the micro-based processing unit to preset the PN processor 54 through the line labeled ACQ PRESET. The PN processor 54, is a non-coherent delay lock PN tracking loop. When the delay lock loop has acquired lock, the PN processor 54 provides a LOCK INDICATOR signal to the micro-based processing unit 46, a SYSTEM CLOCK signal (at the chip rate), and the PN code waveform to the mixer 52. In the mixer, the PN code is multiplied by the IF signal to generate a de-spread signal which is demodulated by a conventional BPSK demodulator 60 to recover the data. The baseband data is presented to a forward error correction (FEC) decoder 62 which generally corrects all errors that have occurred in the data. In the preferred embodiment of the invention, the error correcting code is a rate ½ convolutional code. The hardware implementation for the decoder for this type of code is typically based on the Viterbi algorithm and is commercially available. Under usual conditions, such a decoder results in a signal to noise ratio improvement of about 5 dB. The decoded data is presented to a parity decoder 64 in which any remaining errors are likely to be detected by failure of the parity check. The parity decoder 64 provides both the data and an indication of whether any errors were detected in the frame to the micro-based processing unit 46. Messages intended for this user, as indicated by the user ID address, are placed into an incoming message buffer for subsequent processing. The micro-based processing unit 46 communicates messages and control signals to and from the user through the input and display unit 48, which may include a keyboard and a liquid crystal display (LCD).

The micro-based processing unit 46 also controls the transmit functions of the user transceiver. When a message or position request is to be transmitted, the processing unit awaits the next IMPLIED INT PULSE from the PN processor 54. The implied interrogation pulse is generated whenever the PN generator reaches the all-ones state, which corresponds to the beginning of each received outbound frame as shown in FIG. 6. Upon the occurrence of the next implied interrogation pulse, the micro-based processing unit produces a timed BURST ENABLE signal and a START PREAMBLE signal and presents these along with the data to the transmit circuitry of the transceiver, which is illustrated in FIG. 13.

THE START PREAMBLE signal triggers the start of the TX counter 68 shown in FIG. 13, which provides the timing for the subsequent steps in the message transmission. The TX counter 68 clocks seven successive 1023 chip PN code words out of the 1023 PROM 70 and directs the multiplexer 72 to accept the first six code words directly from the 1023 PROM and to accept the seventh code word through the inverter 74. In this manner, the user response signal burst preamble as shown in FIG. 9 is formed. Next, the TX counter 68 directs the PN generator 76 to generate the long PN code portion of the user reply signal burst. The long PN code remains unmodulated by data for a period of time, designated $T_{ACQ}$ in FIG. 9, in order to allow the ground station receiver time to acquire the code. In the preferred embodiment of the invention, $T_{ACQ}$ is about 5 ms. Following the time interval $T_{ACQ}$, the data is FEC encoded by an encoder 78 for error protectin and is modulo-2 added to the PN code in the adder 80. The multiplexer 72 routes the preamble, followed by the unmodulated long PN code and by the long PN code modulated by data, into the BPSK modulator 82. The BPSK modulator is enabled for the duration of the user reply signal burst by the BURST ENABLE signal from the micro-based processing unit 46 and generates the IF output.

Figure 14A:
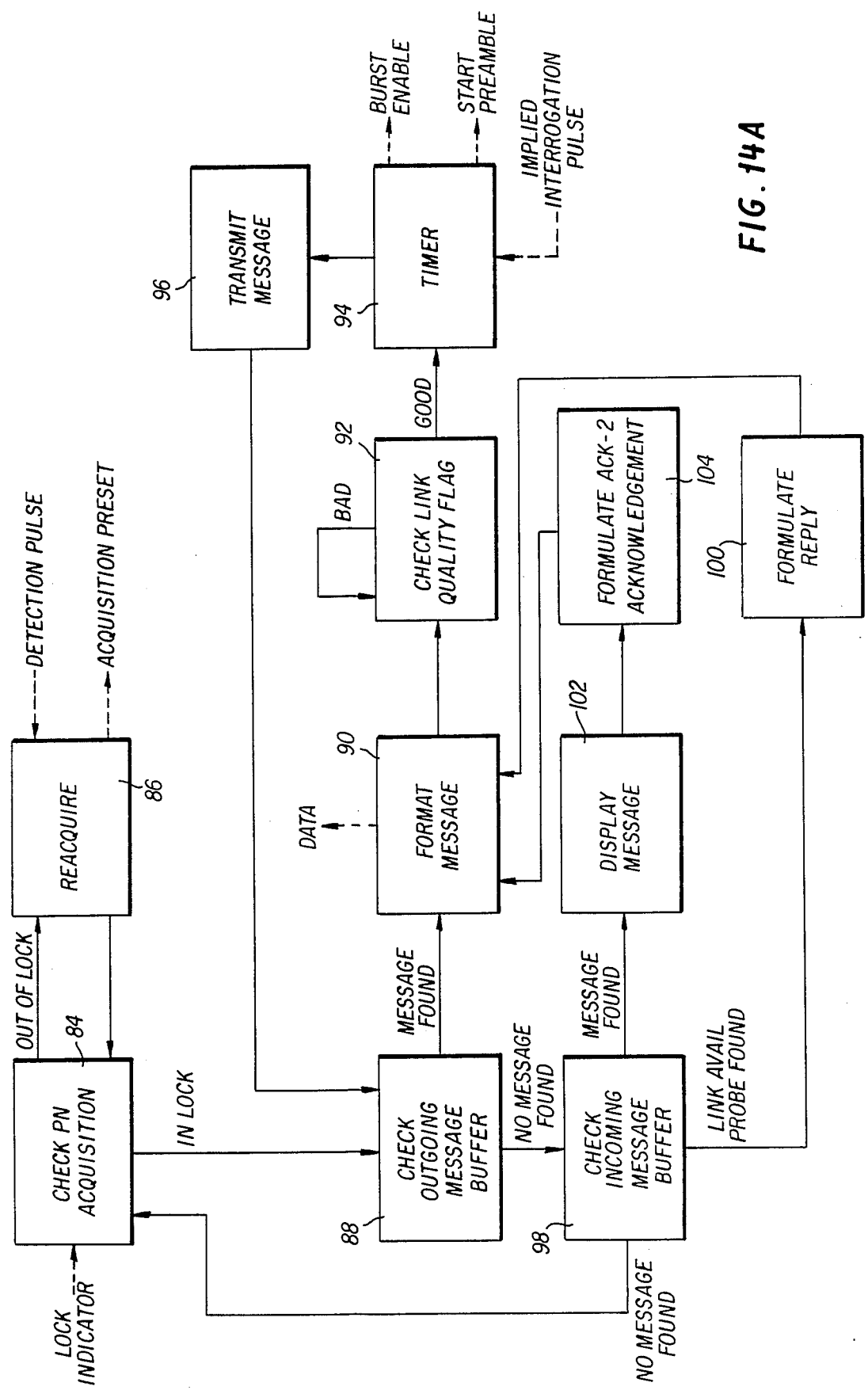
FIGS. 14A and 14B depict logical flow diagrams for the processing unit which controls the user transceiver hardware shown in FIGS. 11-13.
Figure 14B:
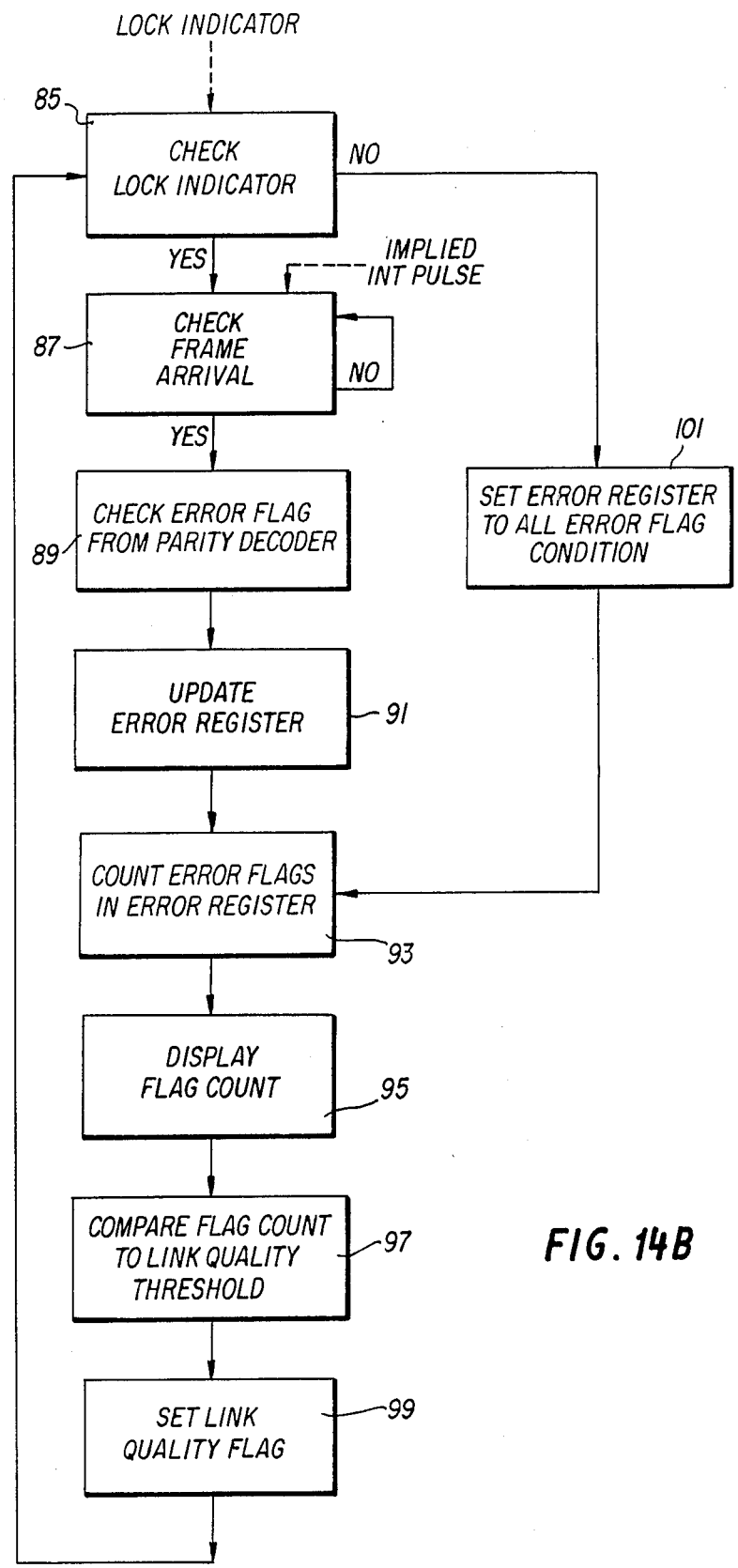

The sequence of control and message handling functions performed by the micro-based processing unit 46 is depicted in the flow diagram of FIG. 14A. FIG. 14B illustrates in detail the sequence of steps involved in the link quality monitoring procedure, which is carried out continuously and in parallel with the other control and message handling functions of the transceiver. In both FIG. 14A and FIG. 14B, the solid lines represent logical transitions in the software while the dashed lines represent the actual signals which are required by or generated by the associated logical function.

Referring first to FIG. 14A, the processor initially checks, in block 84, whether the PN code has been acquired based on the LOCK INDICATOR signal. If the receiver is out of lock, the processor attempts to reacquire lock in block 86 by sensing the next detection pulse generated by the PN epoch estimator 56 and thereupon providing an ACQUISITION PRESET signal to the PN processor 54. When the LOCK INDICATOR signal indicates that lock has been acquired, the processor checks the outgoing message buffer in block 88. If a message is found, it is formatted for transmission in block 90 and provided to the FEC encoder 78. Before initiating transmission, the processor checks a stored link quality flag in block 92. In the preferred embodiment of the invention, the link quality is based on the member of frames from among the seven most recently received frames in which the parity decoder 64 has detected errors. This number is maintained on a continuing basis by the processor, as will be described below in connection with FIG. 14B, and is always available to the quality check function in block 92. If the link quality is currently bad (i.e., below a predetermined threshold value), the processor continually rechecks until the quality is good. Upon the occurrence of acceptable link quality, the timer in FIG. 12 provides the BURST ENABLE and START PREAMBLE signals based on the implied interrogation pulse and the message is transmitted in block 96. The processor then rechecks the outgoing message buffer in block 88. If no message is found in the outgoing message buffer at this point, the incoming message buffer is checked in block 98. If a link availability probe (to be described in a later section) is found in the incoming buffer, an affirmative reply is formulated in block 100, formatted in block 90, and subsequently transmitted upon the detection of acceptable link quality. If any type of message is found in the incoming buffer, it is displayed to the user in block 102 and an ACK-2 acknowledgement is formulated in block 104, formatted in block 90, and subsequently transmitted. If the user reads the displayed message, he so indicates by means of an appropriate button or keystroke on the input and display unit 48, which places an ACK-3 acknowledgement into the outgoing message buffer. If no messages are found in the incoming message buffer, the processor rechecks the PN code lock and the entire control process repeats.

Referring now to FIG. 14B, the link quality monitoring procedure begins in block 85, where the processor checks for the LOCK INDICATOR signal of FIG. 12. If PN lock has been acquired, the processor proceeds to block 87 and checks for a frame arrival. This is indicated by the presence of the IMPLIED INT PULSE in FIG. 12. If the implied interrogation pulse is not found, the processor rechecks repeatedly until a frame arrival is detected. When this occurs, the processor proceeds to block 89 and checks for the presence of an error flag at the output of the parity decoder 64 of FIG. 12. In an exemplary embodiment, the error flag is represented by a single bit which may be in the 1 state (to indicate an error in the current outbound signal frame) or the 0 state (to indicate the absence of detected errors in the current outbound signal frame). In block 91, the error flag is inserted in the first stage of a shift register containing seven stages, each stage representing one of the seven most recent outbound signal frames. The shift register serves as an error register for storing a recent history of errors that have been detected in the outbound signal from the ground station. At the same time as the new error flag is inserted into the error register, the seventh most recent (i.e., oldest) error flag in the last stage of the error register is discarded. The error register may be provided as a separate hardware component, if desired, but it is preferably implemented as a software function in the programming of the micro-based processing unit 46 of FIG. 12.

With continued reference to FIG. 14B, the processor moves to block 93 after updating the contents of the error register. In block 93, the error flags in the error register are counted by determining the total number of flags having the 1 state. For example, if the error register contains three flags in the 1 state and the remaining four in the 0 state, the count determined in block 93 is 3. In block 95, this count is displayed to the user via the input and display unit 48 of FIG. 12. Thus, for the best measured link quality, the user will observe a count of 0, representing a zero error rate for the seven most recent outbound signal frames; whereas for the worst measured link quality, a count of 7 will be displayed. In order to stabilize the display, it may be preferable to update the count at a relatively slow rate, such as once per second, using the peak value of the count recorded during the preceding one-second interval. As an alternative to a numerical display, the user may be presented with periodically updated informational messages describing the link quality as unacceptable, marginal, acceptable, and so on. Once the measured link quality has been displayed to the user, the processor proceeds to block 97 and compares the flag count to a predetermined threshold value. (If desired, the threshold value can be subject to variation by the user and/or ground station.) Based on this comparison, the processor in block 99 sets a single-bit link quality flag to the 0 to 1 state. As an example, if the error flag count is 5 and the threshold value is 4, the link quality flag is set to the 1 state to indicate unacceptable link quality (i.e., the number of errors exceeds the threshold value). The link quality flag is tested by the processor in the flow diagram of FIG. 14A as a means for determining whether the measured link quality is sufficient to allow a response by the user transceiver. After the link quality flag is set in block 99, the processor loops back to block 85 to check for PN lock, and the process repeats. If PN lock is not found in block 85, the processor proceeds to block 101 and sets the error register to an all-error-flag condition (i.e., all ones). This insures that the transceiver will record unacceptable link quality in situations where PN lock has not been acquired.

Rather than using a separate code for error detection, as in the illustrated embodiment, it is possible to rely exclusively on the FEC decoder 62 of FIG. 12. In the typical implementation of a convolutional decoder, the Viterbi algorithm is used. The variation of the path metrics in the operation of the decoding algorithm provides a direct measure of the error rate and hence of the link quality. Therefore, in alternative embodiments the link quality may be monitored without adding parity check bits to the outbound signal frames and without the need for parity decoding equipment in the user transceivers.

The ability of the user transceiver to monitor the quality of the outbound signal link enables the transceiver to determine automatically whether the return (inbound) link is adequate to justify the transmission of a message. If the user is partially obstructed by buildings, dense foliage, or the like, a message which has been keyed in to his transceiver will be stored until the transceiver records acceptable link quality, and will be sent at that time. In practice, this will occur when the user momentarily passes an open intersection in an urban environment, or is otherwise moved to a position in which a clear line of sight to one or more of the satellites is obtained at least temporarily. Since the user transceiver relies on a "history" of received interrogations, rather than only one, it is unlikely that an isolated error in an outbound frame will suppress a transceiver response during a period of generally acceptable link quality; and, conversely, it is unlikely that a message will be sent by a user transceiver in reliance on an isolated error-free outbound frame during a period of generally poor link quality.

It should be noted that the basic interrogation and response format that underlies the present system also embodies a simple link quality sensing function; that is, if the link quality is so poor that the outbound signal from the ground station does not reach the user transceiver at all, no reply signal is possible. The fact that the present invention employs general interrogation signals receivable by all users, rather than discrete interrogations directed to specific users, is also advantageous. Because the interrogations are not discretely addressed, each user transceiver can continually monitor and update the link quality at the interrogation rate (95 times per second in the preferred embodiment), allowing it to transmit a response at the very moment the link quality becomes acceptable. Thus the transceiver is capable of sending its response even if it has a clear line of sight to a satellite for only a short time. In the case of a moving transceiver, this means that the transceiver requires a clear line of sight to a satellite for only a short distance during its motion (e.g., about 2.0 meters at 60 mph).

It is preferred that the user transceiver of FIGS. 11–13 be arranged to disable itself for a non-precision time interval after it responds to an interrogation from the ground station. This may be accomplished by incorporating an inhibit function into the programming of the micro-based processing unit 46 or by using a separate inhibit circuit. In normal operation, when the user desires position information or wishes to send a message, this is requested by depressing a "send" button in the input and display unit 48. This temporarily overrides the inhibit function and allows the next incoming interrogation to trigger a response from the user transceiver. In this mode, the inhibit function is always in effect unless overridden by the user's depressing the "send" button. In a second mode of operation, which is useful for continuous monitoring of transceiver location by the ground station, the inhibit function is enabled immediately following the transmission of a user reply signal for a predetermined non-precision inhibit interval $T_i$ (typically much greater than the frame length $T_F$ of FIG. 6). Following this interval, the inhibit function becomes ineffective until the transceiver responds to the next received interrogation. Thus the ground station has position information for this transceiver which is updated approximately every $T_i$ seconds.

The purpose of the inhibit circuit is to reduce the effective response rate of the user transceivers by causing the transceivers to respond to only a certain fraction of all interrogations. This reduces the incidence of reply signal overlap at the ground station and also reduces the burden on the ground-based position computation equipment. The inhibit interval can be made different for different classes of users, and can be varied for a given user during different periods of need. Reference is made to the aforementioned U.S. Pat. No. 4,359,733 and to U.S. patent application Ser. No. 641,385, both incorporated herein by reference, for a discussion of the transceiver inhibit function.

Satellite Electronics

Figure 15:
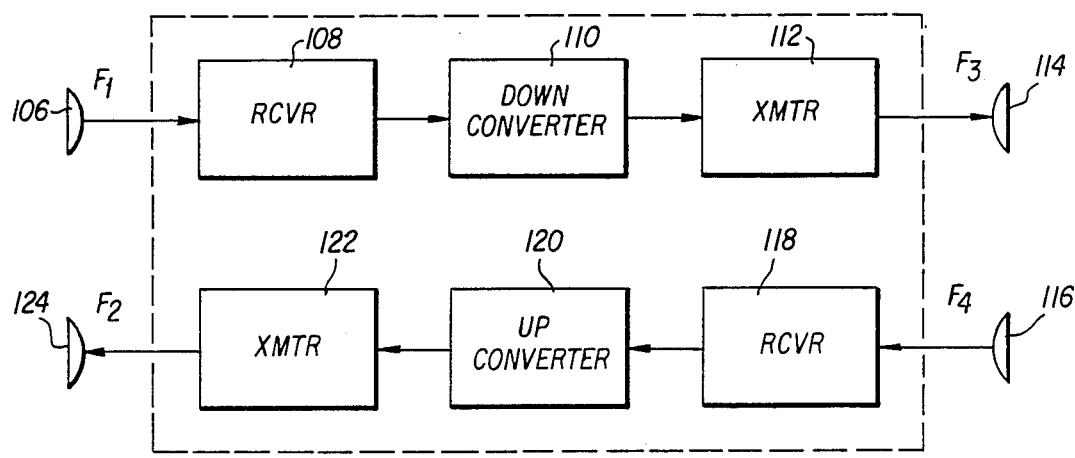
FIG. 15 illustrates the hardware configuration which is common to all three satellites shown in FIGS. 1 and 2.

The complexity of the satellite-carried electronics is kept to a minimum in the present invention. In fact, the present system is designed such that the space segment may be configured as an "add-on" or "piggyback" payload package to an existing satellite and use only the overcapacity of power available during the first few years of satellite life. The satellite block diagram shown in FIG. 15 is simple and conventional in design. The satellite merely serves to provide the signal reception, frequency translation, and signal retransmission required. It does not contain any critical time measurement circuitry nor is it required to contain any significant processing circuitry.

Although only one of the three satellites illustrated in FIG. 1 is used to relay the outbound signal to the user transceivers, the circuitry of the three satellites S1, S2 and S3 is identical. Hence any one can be selected to perform the outbound relay function shown in FIG. 1. Furthermore, a modification of the position determination system disclosed by this invention, to be described below, would allow for the simultaneous transmission of three outbound signals through the three satellites by utilizing a different pseudorandom noise (PN) code sequence for each of the three paths. The identical satellite configurations enable this modification to be easily implemented.

Referring to FIG. 15, the outbound signal from the ground station is captured by a satellite outbound receive antenna 106 at frequency $F_1$ and sequentially passed to an outbound low noise receiver 108, a down converter 110, an outbound transmitter 112, and an outbound transmit antenna 114 for broadcast mode radiation down to the user transceivers at frequency $F_3$. Similarly, user response signals are captured at frequency $F_4$ by a satellite inbound receive antenna 116 and are sequentially passed through an inbound low noise receiver 118, an up converter 120, an inbound transmitter 122, and an inbound transmit antenna 124 at frequency $F_2$.

Although FIG. 15 depicts four separate antennas, it is preferable to utilize a single reflector for all four and to provide two feedhorn assemblies (each including a transmit/receive diplexer), one for the antennas 106 and 124 linking the satellite to the ground station and a second for the antennas 114 and 116 linking the satellite to the user transceivers. The satellite components depicted in FIG. 15 are all conventional in design and are fabricated from readily available parts. Accordingly, a detailed description of these components is not necessary.

In order to increase the immunity of the system to background noise, and to reduce the signal power requirement of the user transceivers, a number of overlapping spot beams may be utilized for the links between the user transceivers and the satellites (i.e., the $F_3$ and $F_4$ transmissions). Reference may be had to the aforementioned copending application Ser. No. 641,385, incorporated herein by reference, for a description of the equipment required to implement this modification.

Ground Station Equipment

Figure 19:
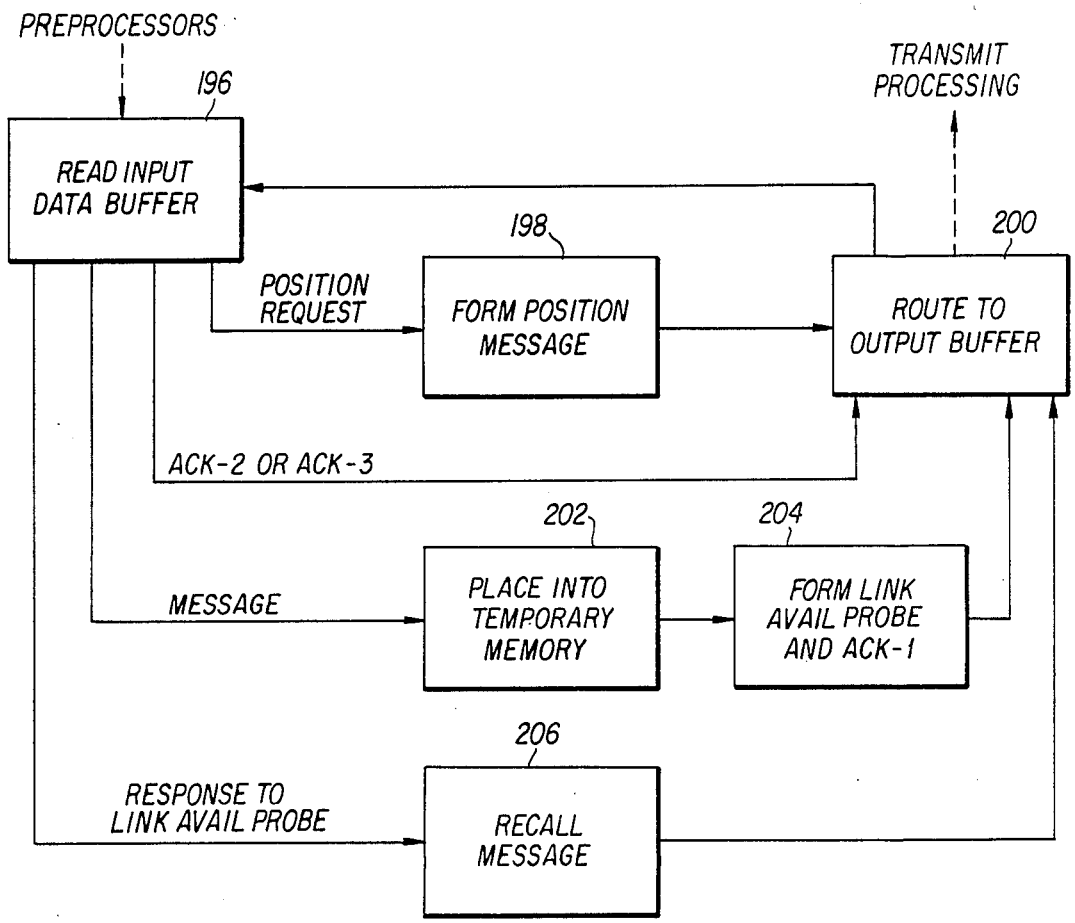
FIG. 19 illustrates the logical flow diagram of the central processor which controls the ground station hardware shown in FIGS. 16-18.
Figure 16:
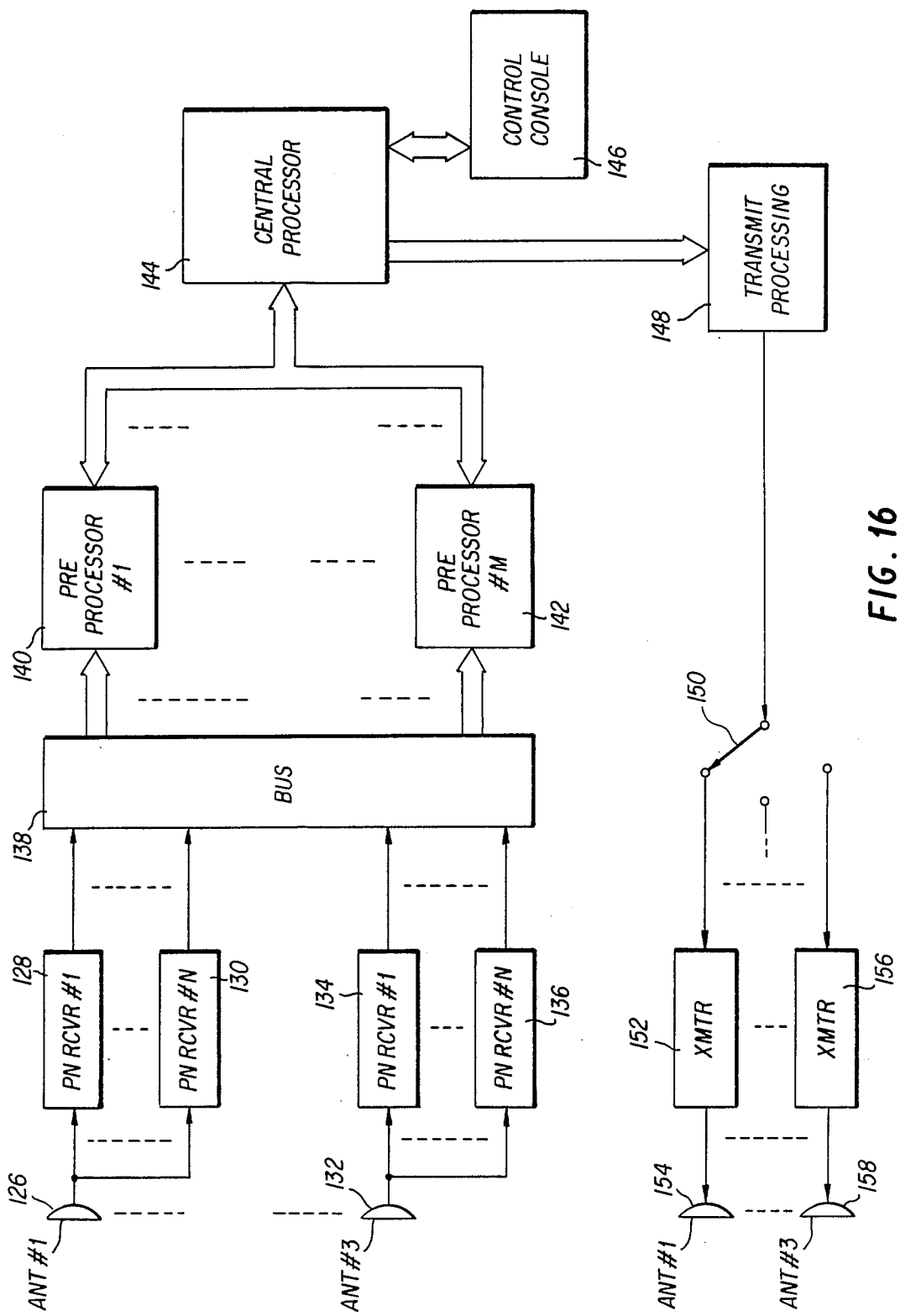
FIGS. 16-18 depict the hardware implementation of the ground station.
Figure 17:
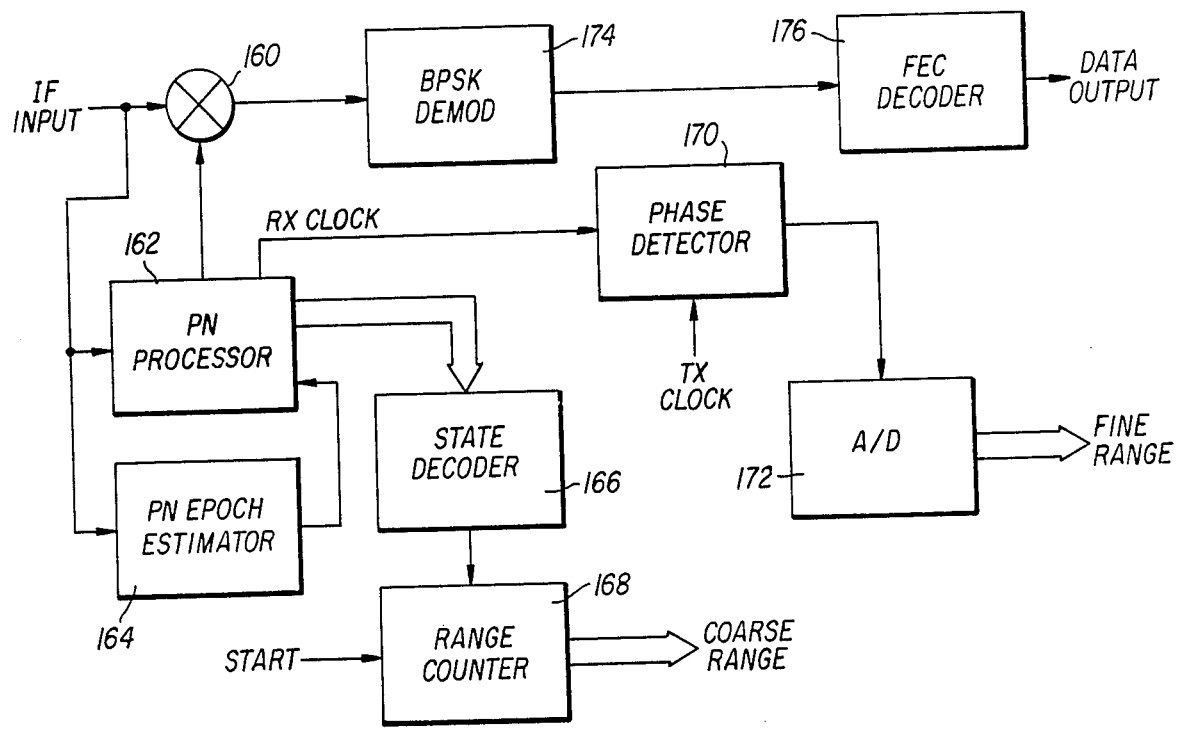
Figure 18:
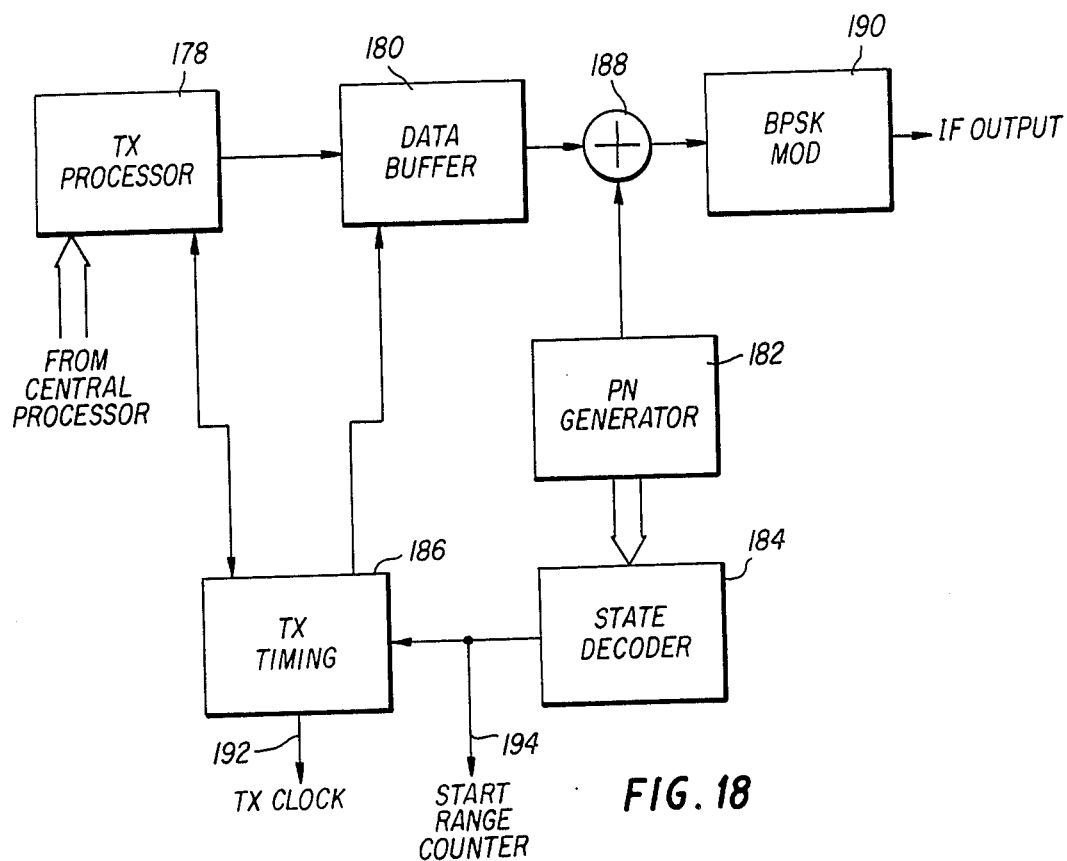

The ground station segment of the present invention is responsible for receiving messages and position requests from users, calculating user positions, formulating various types of messages, monitoring link availability, and transmitting messages to users. The ground station subsystems are illustrated in FIGS. 16, 17 and 18. A flow diagram of the control logic followed by the ground station is depicted in FIG. 19.

A general overview of the ground station subsystems including both receiving and transmitting components is illustrated in FIG. 16. The ground station is required to simultaneously receive signals from all three satellites S1, S2 and S3. This is accomplished by providing a dedicated antenna and receiver bank for each of the three satellites. In FIG. 16, the antenna 126, the first receiver 128, and the Nth receiver 130 for satellite S1, and the antenna 132, the first receiver 134, and the Nth receiver 136 for statellite S3 are shown explicitly. The antenna and receiver bank for satellite S2 are identical but have been omitted from the drawing for clarity. The use of dedicated antennas allows the three signal paths from a specific user to be resolved spatially. Within each receiver bank, each of the N receivers is designed to receive one of N specific PN codes. In the preferred embodiment of the invention, N equals 32. Each receiver strips off the PN code, demodulates the data, corrects errors, and estimates the round trip path length to the user.

The receiver outputs are routed by the bus 138 to one of M preprocessors of which the first 140 and Mth 142 are shown explicitly in FIG. 16. A particular preprocessor which is momentarily unoccupied is selected by the bus 138 and is provided with the three range measurements and message data from a specific user. If the user has sent a message, the preprocessor simply passes the message on to the central processor 144. If the user has sent only a position request, as indicated by an absence of data bits, the preprocessor calculates the user position and passes this information to the central processor 144. After carrying out these functions, the preprocessor is available for reassignment by the bus. The number M of preprocessors which is required depends on the rate of user responses and the speed of the position calculation, and is chosen so that there is a high probability that at least one preprocessor is available at all times.

The central processor 144 is responsible for the formulating and routing of all outgoing messages. A control interface with the ground station operator is provided by the control console 146. Outbound messages are presented to the transmit processing subsystem 148 by the central processor 144 and are routed by the signal switch 150. Outbound signals destined for satellite S1 are routed through the first transmitter 152 and antenna 154. Signals destined for satellite S3 are routed through the third transmitter 156 and antenna 158. A similar path for signals destined for satellite S2 is provided but has been omitted from FIG. 16 for clarity. The signal switch 150 allows the outbound interrogation and message signals to be alternated among satellites S1, S2 and S3, if desired, rather than being constrained to satellite S2 as in FIG. 1.

The components within each of the PN receivers shown in FIG. 16 which process the IF signal are illustrated in FIG. 17. The IF input is presented in parallel to a mixer 160, a PN processor 162, and a PN epoch estimator 164. The PN epoch estimator 164 uses a SAW matched filter to detect the seven 1023 chip PN code words in the user burst preamble. The PN epoch estimator signals the PN processor 162 when the preamble is detected and the PN processor acquires the long PN code using a non-coherent delay locked loop. A state decoder 166 observes the 17 bits of the PN code generator and presents a signal to a range counter 168 when the all-ones code state is reached. The range counter 168 counts the number of chip intervals which elapse between the transmission of an all-ones state from the ground station, as indicated by the START input to the range counter, and the reception of an all-ones state from a user, as indicated by the output of the state decoder 166. The resulting chip count is the round trip range to the user to the nearest chip, designated COARSE RANGE.

The PN processor 162 provides a receiver chip rate clock (RX CLOCK) to a phase detector 170, in which the phase of the receiver chip rate clock is compared to the phase of the transmitter chip rate clock (TX CLOCK). The resulting analog phase difference, expressed as a fraction of a chip, is converted into a digital format by an analog-to-digital converter 172 to form the quantity designated FINE RANGE. The combination of coarse and fine range measurements determine round trip path length to an accuracy of about 1.4 meters with an ambiguity in excess of 3000 km. The locally generated PN code is multiplied by the IF signal in the mixer 160 to despread the signal. The signal is then BPSK-demodulated by the unit 174 and FEC-decoded by a decoder 176. The data output and range measurements are passed on to the ground station bus 138 of FIG. 16.

The components of the ground station transmit processing subsystem are illustrated in FIG. 18. Messages from the central processor 144 of FIG. 16 are presented to a transmit processor 178. The set of messages which will constitute one outbound signal frame are placed into a data buffer 180. Within the data buffer 180, the messages are processed to form one outbound frame as illustrated in FIG. 7, that is, the error-detecting parity bits are added and the frame is convolutionally encoded. A free-running PN generator 182 continuously generates 131071 chip code words ($2^{17}-1$ chips per code word). When the state decoder 184 detects the all-ones state, a transmit timing subsystem 186 is signalled and begins clocking the formatted data out of the data buffer 180. The formatted data and the PN code are modulo-2 added in the adder 188 before being BPSK modulated in the unit 190 and routed to a ground station transmitter. The ground station transmit processing sybsystem also generates the transmit clock signal (TX CLOCK) on line 192 and START RANGE COUNTER signal (i.e., the all-ones state indicator) on line 194, the signals being used in the ground station receivers.

The logical flow diagram for the ground station central processor is depicted in FIG. 19. As in the user transceiver flow diagram, the solid lines indicate logical transitions in software and the dashed lines represent actual signals associated with a logical function. In block 196, the processor reads the input data buffer to determine whether any data has been provided by the preprocessors 140, 142. If a position request is found, the processor forms a position message in block 198 using the user ID and position calculation provided by the preprocessor and routes this message to the output buffer in block 200. The output buffer feeds outbound message traffic to the transmit processing subsystem. If ACK-2 or ACK-3 acknowledgements are found in the input data buffer, they are routed to the user who originated the message which is being acknowledged. If a message is found in block 196, it is first placed into temporary storage in block 202. The processor then proceeds to block 204 and forms a link availability probe for transmission to the destination user and an ACK-1 acknowledgement for transmission back to the originating user. At some later point in time, when the destination user has responded to the link availability probe, the message is recalled in block 206 and routed to the output buffer in block 200. In the case of short messages, the link availability probe is not necessary and can be omitted if desired. In these situations, the message can be sent directly and repeated, if necessary, until the ACK-2 acknowledgement is received from the destination transceiver.

System Modifications

There are several easily implemented modifications and extensions of the system described above which can increase capacity, reduce user delays, and decrease power requirements. These include multiple simultaneous outbound signals, code alternation, adaptive control of link quality, random beam searches, and coding of user replies by coarse and fine time slots.

Figure 20:
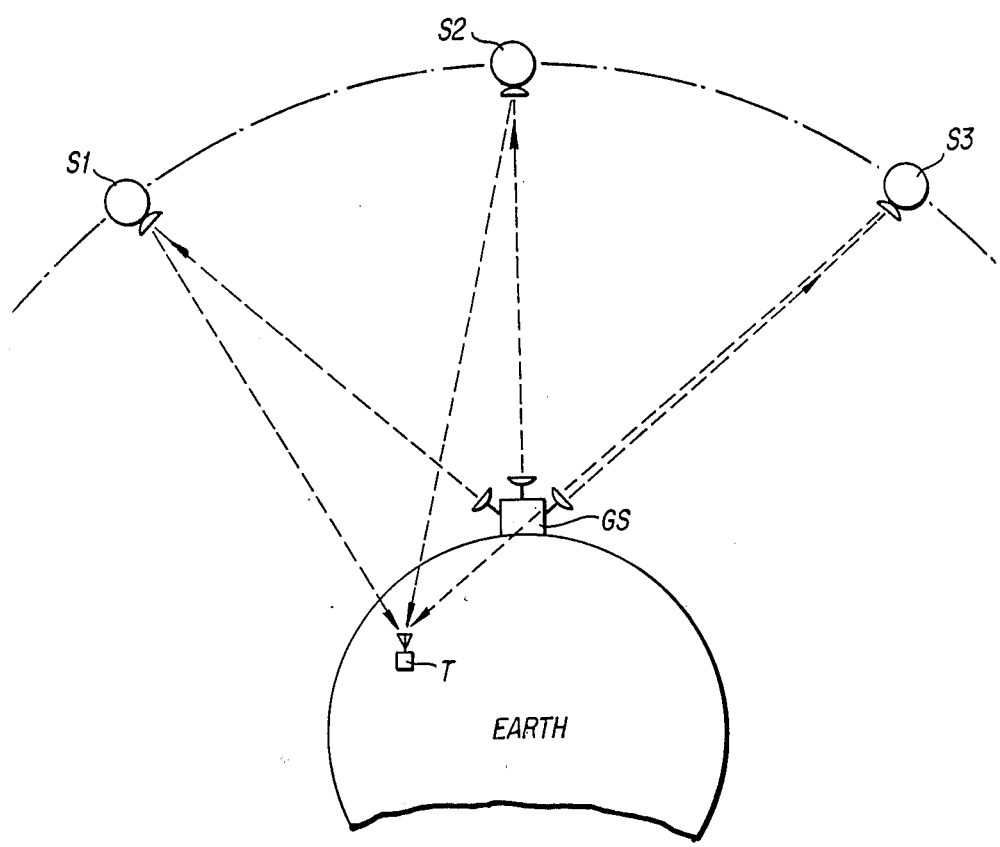
FIG. 20 illustrates an alternative mode of operation in which simultaneous outbound interrogation signals are relayed to the user through more than one satellite.

In order to make full use of the total power available in all three satellites S1, S2 and S3 shown in FIG. 1, three simultaneous outbound signals may be transmitted by the ground station, one through each satellite. Such a configuration of signal paths is shown in FIG. 20. The inbound signal paths would be the same as used in the basic system, as shown in FIG. 2. In this configuration, outbound signals from the ground station are continuously transponded by each of the three satellites to the user with each of the three transponded signals employing a different PN code. Sophisticated user transceivers which are able to receive and decode all three PN-coded outbound signals simultaneously can monitor link quality and transmit position requests (as distinguished from messages) only when all three links are available. Furthermore, to maximize system utility for less sophisticated user transceivers which can receive and decode only one particular PN-coded outbound signal, code alternation may be employed. For example, if the three PN codes used on the three outbound signals are labelled Code A, Code B and Code C, then for a short time (e.g., 0.33 second) the ground station can send Code A through satellite S1, Code B through satellite S2, and Code C through satellite S3. For the next third of a second, the code assignment can be B:S1, C:S2 and A:S3, followed by C:S1, A:S2 and B:S3 for the final third of each second. Thus, even when two of the three satellites are obscured by buildings, mountains or other obstructions, the simplest transceivers (i.e., those equipped to decode only a single PN code) will have access to a satellite through which the transceiver can transmit messages.

A further modification of the basic embodiment, making more efficient use of the available satellite power, can be described as adaptive control of the link quality. The outbound signal from the ground station employs PN coding to provide the requisite signal-to-noise ratio, with a spread ratio in the basic embodiment of 193 chips per bit. The coding gain in a PN system, i.e., the improvement in signal-to-noise ratio, is numerically equal to the spread ratio (the number of chips per bit). However, the amount of satellite energy required to transmit a message is directly proportional to the spread ratio. Thus, efficient system usage requires minimizing the spread ratio consistent with signal-to-noise ratio requirements. This is accomplished adaptively based on individual user to satellite link conditions by means of multiple frame formats. In addition to the nominal outbound signal frame format with a spread ratio of 193 chips per bit, as illustrated in FIG. 7, the adaptive system provides frames with spread ratios of 97 and 47. The format of the frames is the same as that shown in FIG. 7, but the number of chips per bit will be either 193, 97 or 47. In the simplest version of an adaptive system, the frame formats of the outbound signal alternate with spread ratios of 193, 97, 47, 193, 97, 47 and so on. The user transceivers are set up to decode 193, 97 and 47 chip codes and continually monitor the outbound link quality for each spread ratio by means of the error detecting code in each frame, as already described. Hence the user transceivers at all times know the minimum spread ratio required by the link for error free operation. When the ground station has a message ready for transmission, the link availability probe is sent to the destination user in a 193 spread ratio frame. In the destination user's reply to the link availability probe, the minimum acceptable spread ratio is designated. The ground station then transmits the message to the destination user in the next available frame having the designated spread ratio. If, for example, a spread ratio of 47 is designated, the message may be forwarded using only about one-fourth of the satellite energy which would be required by the basic non-adaptive system.

The adaptive control principle requires that the user transceivers be set up to decode PN codes with different spread ratios. This may be implemented by hardware or by a software program in the transceiver processor. In the latter case, the programming can be changed or updated by the ground station through a series of outbound messages containing reprogramming instructions. The reprogramming might designate new PN codes, a different scheme for selecting among different PN codes, and so on. As a further enhancement, the adaptive control principle may be applied not only to the outbound signals from the ground station to the users, but also to the inbound signals from the user transceivers to the ground station.

In the preferred embodiment of the invention, the link quality information is continuously displayed to the user by means of the input and display unit 48 of the user transceiver. This allows for a mode of operation at the user level which may be referred to as a randon beam search mode. In this mode, the user antenna is assumed to be a narrow-beam, high-gain antenna rather than a broad-beam, omnidirectional antenna as described earlier. The use of an antenna with gain may be desirable in order to reduce the power requirement of the user transceivers, or to reduce the size requirement of the satellite antennas, or for both of these reasons. Normally, one would expect to have to gyro-stabilize the user antennas in order to insure that they remain pointed at the satellites. In the present system, however, advantage can be taken of the fact that user transmission are short bursts lasting perhaps 25 milliseconds (for a full 256-bit message) out of several seconds or minutes, coupled with the fact that the user transceiver is continually monitoring the quality of the satellite link. If the user transceiver has an antenna with high gain, and the user wishes to send a message, the user merely keys in the message, requests transmission of the message (e.g., by depressing a "send" button) and then moves the transceiver antenna in random directions. When the random changes of angle happen for a moment to point the antenna at a satellite transponding the outbound signals from the ground station, the transceiver will momentarily record acceptable link quality. At that moment, the transceiver will trigger itself to send the message, and will alert the user through an appropriate display to maintain the transceiver antenna in the same position until the ACK-1 acknowledgement is received from the ground station.

As a further modification to the illustrated embodiment, coding by coarse and fine time slots may be employed to reduce the number of identification bits which are required to be transmitted by a user transceiver, particularly in an ACK-2 or ACK-3 response. A similar technique can be used to reduce the number of bits which are required to be sent by the ground station to identify a particular transceiver, as for example, during an ACK-1 transmission. The use of different PN codes for different groups of users, as in the principal embodiment, already divides the users into identifiable subgroups. In the example given, 32 (or $2^5$) different PN codes are employed, and therefore, the 5 highest-order bits of the user I.D. are given by the codes themselves, not requiring transmission as data. To obtain a further bit reduction, the next highest-order bits may be encoded in the outbound signal by placing messages for specific user groups only in certain numbered frames of the outbound interrogation signals, or, in the case of the inbound signals, by having specific user groups respond only to certain number frames of the outbound interrogation signals. For example, if the frames of the outbound interrogation signal are numbered modulo 128, then both the ground station and the user transceivers can encode up to 7 bits of the user I.D. by the choice of which frame to send a message on or which frame's interrogation to respond to. The number of bits may be reduced even further by relying on time delays within a particular frame of the outbound signal after communication has been established between the ground station and a particular user transceiver. For outbound transmissions from the ground station to the users, the position of a message within a given frame may specify a particular user or subgroup of users. For inbound transmissions from a user to the ground station, an artificial time delay may be added to the user response to encode some or all of the remaining user I.D. bits. Once a particular transceiver establishes communication with the ground station, its time of response is known to within a few nanoseconds; therefore, it is possible to encode information by introducing varying amounts of delay. The delay increments are chosen to be much greater than the time jitter associated with a particular transceiver's response, and, in the case of a moving transceiver, the increments are also chosen to be much greater than the variation in reply signal arrival time associated with reasonable and expected user velocities.

Although the present invention has been described with reference to a preferred embodiment, it should be understood that the invention is not limited to the details thereof. Various modifications and substitutions have been suggested in the foregoing detailed description, and others will occur to those skilled in the art. All such modifications and substitutions are intended to be embraced within the spirit and scope of the invention as defined in the appended claims.

What is claimed is:

1. A radio communication system comprising:
    a central station for transmitting interrogation signals over a radio communication link which is subject to variations in signal propagation quality;
    a remote transceiver for receiving interrogation signals from the central station over said radio communication link, and for transmitting reply signals to the central station in response to the interrogation signals; and
    control means in said remote transceiver for measuring the quality of the radio communication link between the central station and the remote transceiver, and for allowing the transmission of a reply signal by the transceiver only when said communication link has at least a predetermined minimum quality.

2. A radio communication system as claimed in claim 1, wherein said control means is effective to detect errors in the received interrogation signals, and to derive from the absence or presence of said errors a measurement of the quality of the communication link.

3. A radio communication system as claimed in claim 2, wherein:
    said control means maintains a running count of errors detected in a number of recently received interrogation signals; and
    said control means is effective to compare said count with a predetermined threshold value in order to determine whether the communication link has at least the predetermined minimum quality required for the transmission of a reply signal by the transceiver.

4. A radio communication system as claimed in claim 3, wherein said transceiver further includes display means connected to said control means for displaying the measured quality of the communication link.

5. A radio communication system as claimed in claim 2, wherein:
    said interrogation signals comprise binary digital signals incorporating error detection codes; and
    said control means includes decoding means responsive to said error detection codes for measuring the quality of the communication link.

6. A radio communication system as claimed in claim 5, wherein:

said error detection codes comprise parity check bits; and said decoding means comprises a parity decoder.

7. A radio communication system as claimed in claim 1, wherein said radio communication link includes at least one satellite.

8. A radio communication system comprising:
a central station for transmitting a sequence of interrogation signals containing error detection codes;
a remote transceiver for receiving said interrogation signals over a radio communication link between the central station and the remote transceiver, said radio communication link being subject to variations in signal propagation quality, and for transmitting reply signals containing message information to the central station in response to said interrogation signals; and
control means in the remote transceiver for utilizing said error detection codes to provide an indication of the quality of the communication link between the central station and the remote transceiver, and for suppressing the transmission of a reply signal by the remote transceiver until at least a predetermined minimum quality of the communication link is indicated.

9. A radio communication system as claimed in claim 8, wherein:
said control means maintains a running count of errors detected in a number of recently received interrogation signals; and
said control means is effective to compare said count with a predetermined threshold value in order to determine whether the communication link has at least the predetermined minimum quality required for the transmission of a reply signal by the transceiver.

10. A radio communication system as claimed in claim 8, wherein said remote transceiver further includes display means connected to said control means for displaying an indication of the quality of the communication link to a user.

11. A radio communication system as claimed in claim 8, wherein:
said interrogation signals comprise binary digital signals in which said error detection codes comprise parity check bits; and
said control means includes a parity decoder.

12. A radio communication system as claimed in claim 8, wherein said communication link includes at least one satellite for relaying interrogation signals from the central station to the remote transceiver, and for relaying reply signals from the remote transceiver to the central station.

13. A radio communication system comprising:
a central station for transmitting interrogation signals over a radio communication link which is subject to variations in signal propagation quality;
a remote transceiver for receiving interrogation signals from the central station by means of said radio communication link, and for transmitting reply signals to the central station in response to the interrogation signals;
monitoring means in said remote transceiver for monitoring the quality of the radio communication link between the central station and the remote transceiver as a function of the received interrogation signals; and display means connected to said monitoring means for displaying an indication of the quality of the communication link.

14. A radio communication system as claimed in claim 13, wherein said monitoring means is effective to detect errors in the received interrogation signals, and to derive from the presence or absence of said errors an indication of the quality of the radio communication link.

15. A remote transceiver for receiving and responding to error-coded interrogation signals transmitted by a central station over a communication link which is subject to variations in signal propagation quality, comprising:
receiving means for receiving interrogation signals;
monitoring means for monitoring the quality of communication link as a function of errors detected in the received interrogation signals; and
transmitting means connected to said monitoring means for transmitting reply signals in response to the interrogation signal only when said communication link has at least a predetermined minimum quality.

16. A remote transceiver for receiving and responding to error-coded interrogation signals transmitted by a central station over a communication link which is subject to variations in signal propagation quality, comprising:
receive and transmit means for receiving interrogation signals and for transmitting reply signals in response to said interrogation signals;
monitoring means for monitoring the quality of the communication link as a function of errors detected in the received interrogation signals; and
display means connected to said monitoring means for displaying to a user an indication of the quality of the communication link.

17. A radio communication system for sending messages to a ground station from a remote transceiver by means of a satellite, comprising:
a remote transceiver for receiving interrogation signals containing error detection codes and for transmitting reply signals carrying message information in response to said interrogation signals;
a ground station for transmitting interrogation signals containing error detection codes and for receiving reply signals from the remote transceiver;
at least one relay satellite for relaying interrogation signals from the ground station to the remote transceiver over a radio communication link which is subject to variations in signal propagation quality, and for relaying reply signals from the remote transceiver to the ground station; and
control means in the remote transceiver for utilizing the error detection codes in the received interrogation signals to provide an indication of the quality of the radio communication link to the remote transceiver, and for suppressing the transmission of a reply signal by the remote transceiver until at least a predetermined minimum quality of the communication link is indicated.

18. A radio communication system as claimed in claim 17, wherein:
said control means maintains a running count of errors detected in a number of recently received interrogation signals; and
said control means is effective to compare said count with a predetermined threshold value in order to determine whether the communication link has at least the predetermined minimum quality required for the transmission of a reply signal by the transceiver.

19. A radio communication system as claimed in claim 17, wherein said remote transceiver further includes display means connected to said control means for displaying an indication of the quality of the communication link to a user.

20. A radio communication system as claimed in claim 17, wherein:
said interrogation signals comprise binary digital signals in which said error detection codes comprise parity check bits; and said control means includes a parity decoder.

21. A radio communication system for sending messages to a ground station from a remote transceiver by means of a satellite, comprising:
a remote transceiver for receiving interrogation signals containing error detection codes and for transmitting reply signals carrying message information in response to said interrogation signals;
a ground station for transmitting interrogation signals containing error detection codes and for receiving reply signals from the remote transceiver;
at least one relay satellite for relaying interrogation signals from the ground station to the remote transceiver over a radio communication link which is subject to variations in signal propagation quality, and for relaying reply signals from the remote transceiver to the ground station;
monitoring means in the remote transceiver for monitoring the quality of the radio communication link to the remote transceiver as a function of errors detected in the received interrogation signals; and
display means connected to said monitoring means for displaying an indication of the quality of the communication link.

22. A method for sending messages to a central station from a remote transceiver over a radio communication link which is subject to variations in signal propagation quality, comprising the steps of:
transmitting a sequence of interrogation signals containing error detection codes from the central station;
receiving said interrogation signals at the remote transceiver;
utilizing the error detection codes in the received interrogation signals to provide the remote transceiver with an indication of the quality of the radio communication link between the central station and the remote transceiver;
transmitting reply signals containing message information from the remote transceiver to the central station when at least a predetermined minimum quality of the radio communication link is indicated; and
suppressing the transmission of reply signals from the remote transceiver when the indicated quality of the radio communication link is less than a predetermined minimum value.

23. A method for sending messages to a ground station from a remote transceiver over a radio communication link including a satellite, said radio communication link being subject to variations in signal propagation quality, said method comprising the steps of:
transmitting a sequence of interrogation signals containing error detection codes from the ground station;
relaying said interrogation signals through the satellite to the remote transceiver;
receiving said interrogation signals at the remote transceiver;
utilizing the error detection codes in the received interrogation signals to provide the remote transceiver with an indication of the quality of the radio communication link between the satellite and the remote transceiver;
transmitting reply signals containing message information from the remote transceiver to the ground station through the relay satellite when at least a predetermined minimum quality of the radio communication link is indicated; and
suppressing the transmission of reply signals by the remote transceiver when the indicated quality of the radio communication link is less than a predetermined minimum value.

24. A method for establishing radio communication between a ground station and a remote transceiver through at least two relay satellites, each of said relay satellites communicating with the remote transceiver over a radio communication link which is subject to variations in signal propagation quality, said method comprising the steps of:
simultaneous transmitting from the ground station at least two mutually distinguishable interrogation signals containing error detection codes;
relaying each of said interrogation signals to the remote transceiver through a different satellite;
receiving said interrogation signals at the remote transceiver;
utilizing the error detection codes in each received interrogation signal to provide the remote transceiver with an indication of the quality of the radio communication links between the remote transceiver and each of the satellites;
transmitting reply signals from the remote transceiver to the ground station through the satellites when at least a predetermined minimum quality of the radio communication link is indicated for all satellites; and
suppressing the transmission of reply signals by the remote transceiver when the indicated quality of the radio communication link is less than a predetermined value for one or more of the satellites.

25. A method as claimed in claim 24, wherein the simultaneous interrogation signals transmitted by the ground station are distinguished by different pseudo-noise coding, and wherein the step of receiving the interrogation signals at the remote transceiver includes the step of distinguishing the interrogation signals according to pseudo-noise code.

26. A method as claimed in claim 24, comprising the further steps of:
relaying the transceiver reply signals to the ground station through each of the satellites; and
calculating the position of the remote transceiver based on the arrival times of the reply signals at the ground station.

27. A method for sending messages to a ground station from a remote transceiver over a radio communication link including first and second satellites, comprising the steps of:

transmitting first and second mutually distinguishable interrogation signals from the ground station;

relaying the first interrogation signal to the remote transceiver through the first satellite;

relaying the second interrogation signal to the remote transceiver through the second satellite;

retransmitting the first and second interrogation signals from the ground station;

relaying the first interrogation signal to the remote transceiver through the second satellite;

relaying the second interrogation signal to the remote transceiver through the first satellite;

receiving at least one of said first and second interrogation signals at the remote transceiver; and transmitting reply signals containing message information from the remote transceiver to the ground station through at least one of the satellites in response to the received interrogation signal.

28. A method as claimed in claim 27, wherein the first and second interrogation signals transmitted by the ground station are distinguished by different pseudo-noise coding, and wherein the step of receiving at least one of the first and second interrogation signals at the remote transceiver includes the step of decoding at least one of the pseudo-noise codes.

29. A method for sending messages to a remote transceiver from a central station over a radio communication link which is subject to variations in signal propagation quality, comprising the steps of:

transmitting a sequence of pseudo-noise coded interrogation signals containing error detection codes from the central station, said sequence including a repeating series of interrogation signals employing different spread ratios in the pseudo-noise codes;

receiving said interrogation signals at the remote transceiver;

utilizing the error detection codes in the received interrogation signals to provide the remote transceiver with an indication of the quality of the radio communication link between the central station and the transceiver for each of said pseudo-noise code spread ratios;

selecting the lowest pseudo-noise code spread ratio for which the indicated quality of the radio communication link at the remote transceiver is above a predetermined threshold value;

transmitting a reply signal from the remote transceiver to the central station, said reply signal containing an indication of the selected pseudo-noise code spread ratio; and transmitting message information to the remote transceiver from the central station using a pseudo-noise code having the spread ratio selected by the remote transceiver.

30. A method for sending messages from a sending transceiver to a destination transceiver through a central station, comprising the steps of:

transmitting message information from the sending transceiver to the central station;

in response to the receipt of said message information at the central station, transmitting a first acknowledgement from the central station to the sending transceiver;

transmitting the message information from the central station to the destination transceiver;

in response to the receipt of the message information at the destination transceiver, transmitting a second acknowledgement from the destination transceiver to the central station;

relaying the second acknowledgement from the central station to the sending transceiver;

in response to a user input at the destination transceiver indicating that the message information has been read by the user, transmitting a third acknowledgement from the destination transceiver to the central station; and relaying the third acknowledgement from the central station to the sending transceiver.

* * * * *